United States Patent
Xu et al.

(10) Patent No.: US 11,924,878 B2
(45) Date of Patent: Mar. 5, 2024

(54) USER EQUIPMENT, NETWORK SIDE DEVICE, WIRELESS COMMUNICATION METHOD AND STORAGE MEDIUM FOR CHANNEL OCCUPANCY TIME SHARING

(71) Applicant: Sony Group Corporation, Tokyo (JP)

(72) Inventors: Xiaodong Xu, Beijing (CN); Guanyu Chen, Beijing (CN); Yingting Yuan, Beijing (CN); Xin Guo, Beijing (CN); Chen Sun, Beijing (CN); Mengying Sun, Beijing (CN); Rui Liu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 414 days.

(21) Appl. No.: 17/417,119

(22) PCT Filed: Feb. 7, 2020

(86) PCT No.: PCT/CN2020/074491
§ 371 (c)(1),
(2) Date: Jun. 22, 2021

(87) PCT Pub. No.: WO2020/164439
PCT Pub. Date: Aug. 20, 2020

(65) Prior Publication Data
US 2022/0078845 A1    Mar. 10, 2022

(30) Foreign Application Priority Data

Feb. 14, 2019  (CN) .......................... 201910114221.4

(51) Int. Cl.
*H04W 74/08*  (2009.01)
*H04W 72/02*  (2009.01)
(Continued)

(52) U.S. Cl.
CPC ....... *H04W 74/0816* (2013.01); *H04W 72/02* (2013.01); *H04W 72/0446* (2013.01); *H04W 74/002* (2013.01); *H04W 74/0866* (2013.01)

(58) Field of Classification Search
CPC ............. H04W 74/0816; H04W 72/02; H04W 72/0446; H04W 74/002; H04W 74/0866;
(Continued)

(56) References Cited

U.S. PATENT DOCUMENTS 11,765,701 B1 * 9/2023 Bartlett .................. H04B 7/265
                                                                  370/254
2017/0150382 A1 * 5/2017 Martin ............. H04W 72/0446
(Continued)

FOREIGN PATENT DOCUMENTS

CN    107135461 A    9/2017
CN    107889114 A    4/2018
(Continued)

OTHER PUBLICATIONS

Apple: "Considerations on NR V2X physical layer procedure", 3GPP Draft; R1-1900742 Considerations on NR V2X Physical Layer Procedures, 3rd Generation Partnership Project (3GPP), Mobile Competence Centre; 650, Route Des Lucioles; F-06921 Sophia-Antipolis Cede, vol. RAN WG1, No. Taipei, Taiwan;Jan. 21, 2019-Jan. 25, 2019 Jan. 20, 2019 (Jan. 20, 2019), XP051593589,Retrieved from the Internet: URL:http://www.3gpp.org/ftp/Meetings%5F3GPP%5FSYNC/RAN1/Docs/R1%2D1900742%2Ezip [retrieved on Jan. 20, 2019].
(Continued)

*Primary Examiner* — Afshawn M Towfighi
(74) *Attorney, Agent, or Firm* — XSENSUS LLP

(57) ABSTRACT

The present disclosure relates to a user equipment, a network side device, a wireless communication method and a storage medium. The user equipment of the present disclosure
(Continued)

comprises a processing circuit, the processing circuit being configured to: generate channel occupancy time (COT) sharing indication information, wherein the COT sharing indication information comprises time frequency resources used by other user equipments when the user equipment shares a COT with the other user equipments; and send the COT sharing indication information to the other user equipments. By using the user equipment, the network side device, the wireless communication method and the storage medium of the present disclosure, COT sharing can be supported in a D2D communication mode, thereby enabling a channel to be utilized more reasonably, and simplifying a usage process of an unauthorized frequency band in D2D communication.

16 Claims, 13 Drawing Sheets

(51) Int. Cl.
*H04W 72/0446* (2023.01)
*H04W 74/00* (2009.01)

(58) Field of Classification Search
CPC ........... H04W 74/008; H04W 74/0808; H04W 92/18; H04W 76/14; H04L 5/0037; H04L 5/0053; H04L 5/0094; H04L 5/0007
See application file for complete search history.

(56) References Cited

U.S. PATENT DOCUMENTS

| | | | |
|---|---|---|---|
| 2017/0231011 A1 | 8/2017 | Park et al. | |
| 2018/0049143 A1 | 2/2018 | Gupta | |
| 2018/0368090 A1 | 12/2018 | Kadambar | |
| 2019/0306743 A1* | 10/2019 | Wu | H04W 28/0289 |
| 2019/0335423 A1* | 10/2019 | Wu | H04W 72/0453 |
| 2020/0351669 A1* | 11/2020 | Xu | H04W 72/56 |
| 2021/0014892 A1* | 1/2021 | Xue | H04L 27/0006 |
| 2021/0092783 A1* | 3/2021 | Sun | H04W 76/15 |
| 2021/0153195 A1* | 5/2021 | Zhu | H04W 72/23 |
| 2021/0400732 A1* | 12/2021 | Xue | H04W 74/0833 |
| 2022/0167423 A1* | 5/2022 | Aldana | H04W 74/004 |

FOREIGN PATENT DOCUMENTS

| | | |
|---|---|---|
| CN | 108401245 A | 8/2018 |
| CN | 109076558 A | 12/2018 |
| EP | 3783980 A1 | 2/2021 |

OTHER PUBLICATIONS

International Search Report and Written Opinion dated Apr. 28, 2020, received for PCT Application No. PCT/CN2020/074491, Filed on Feb. 7, 2020, 8 pages including English Translation.
Ericsson, "Channel Access Priority Classes for feLAA", 3GPP TSG-RAN WG2 #101 Tdoc R2-1803503, Athens, Greece, Feb. 26-Mar. 2, 2018, pp. 1-3.

* cited by examiner

USER EQUIPMENT, NETWORK SIDE DEVICE, WIRELESS COMMUNICATION METHOD AND STORAGE MEDIUM FOR CHANNEL OCCUPANCY TIME SHARING

CROSS-REFERENCE TO RELATED APPLICATIONS

The present application is based on PCT filing PCT/CN2020/074491, filed Feb. 7, 2020, which claims priority to Chinese Patent Application No. 201910114221.4, titled "USER EQUIPMENT, NETWORK SIDE DEVICE, WIRELESS COMMUNICATION METHOD AND STORAGE MEDIUM", filed on Feb. 14, 2019 with the Chinese Patent Office, each of which is incorporated herein by reference in its entirety.

FIELD

The embodiments of the present disclosure generally relate to the field of wireless communication, and in particular to a user equipment in a wireless communication system, a network side equipment in a wireless communication system, a wireless communication method performed by a user equipment in a wireless communication system, a wireless communication method performed by a network side equipment in a wireless communication system, and a computer readable storage medium.

BACKGROUND

In communications using an unauthorized frequency band, in a case that an equipment required to perform communication accesses a channel, an occupy time for the equipment performing data transmission once is required to be less than a Max Channel Occupy Time (MCOT). A scheme of sharing Channel Occupy Time (COT) between a network side equipment and a User Equipment (UE) has been provided to make full use of the channel in a communication using an unauthorized frequency band, so as to avoid a channel detection process that is required to be performed when an equipment serving as a receiver transmits data to an equipment serving as a transmitter. In such scheme, the COT is shared between the network side equipment and the user equipment, and the network side equipment is responsible for resource scheduling and configuration related to the COT sharing.

Device to Device (D2D) communication technology refers to an information transmission method in which user equipments perform data interaction with each other in the D2D way. In the D2D communication mode, the user equipments directly communicate with each other through a sidelink (SL). A resource allocation manner on the sidelink is not limited to scheduling and configuration performed by a network side equipment. A manner in which the user equipment autonomously selects resources from a resource pool is supported on the sidelink. In addition, multicast/broadcast communication may be supported on the sidelink. Therefore, in view of the above features of D2D communication, the conventional COT sharing scheme is not efficient.

Therefore, it is necessary to provide a technical solution to support COT sharing in the D2D communication mode, to properly make use of a channel and simplify a process of using an unauthorized frequency band in the D2D communication.

SUMMARY

The summary part provides a general summary of the present disclosure, rather than a comprehensive disclosure of a full scope or all features of the present disclosure.

An object of the present disclosure is to provide a user equipment, a network side equipment, wireless communication methods and a computer readable storage medium, to support COT sharing in the D2D communication mode, to properly make use of a channel and simplify a process of using an unauthorized frequency band in the D2D communication.

According to an aspect of the present disclosure, a user equipment is provided. The user equipment includes processing circuitry. The processing circuitry is configured to: generate Channel Occupy Time COT sharing indication information including time frequency resources used by other user equipment when the user equipment performs shares COT with the other user equipment; and transmit the COT sharing indication information to the other user equipment.

According to another aspect of the present disclosure, a network side equipment is provided. The network side equipment includes processing circuitry. The processing circuitry is configured to: generate Channel Occupy Time COT sharing indication information including time frequency resources used by a first user equipment served by the network side equipment when the first user equipment shares COT with a second user equipment served by the network side equipment; and transmit the COT sharing indication information to the first user equipment.

According to another aspect of the present disclosure, a user equipment is provided. The user equipment includes processing circuitry. The processing circuitry is configured to: receive Channel Occupy Time COT sharing indication information; and determine, according to the COT sharing indication information, the time frequency resources used by the user equipment when the user equipment shares COT with other user equipment.

According to another aspect of the present disclosure, a wireless communication method performed by a user equipment is provided. The wireless communication method includes: generating Channel Occupancy Time COT sharing indication information, where the COT sharing indication information includes time frequency resources used by other user equipment when the user equipment shares COT with the other user equipment; and transmitting the COT sharing indication information to the other user equipment.

According to another aspect of the present disclosure, a wireless communication method performed by a network side equipment is provided. The wireless communication method includes: generating channel occupancy time COT sharing indication information, where the COT sharing indication information includes time frequency resources used by a first user equipment served by the network side equipment when the first user equipment shares COT with a second user equipment served by the network side equipment; and transmitting the COT sharing indication information to the first user equipment.

According to another aspect of the present disclosure, a wireless communication method performed by a user equipment is provided. The wireless communication method includes: receiving Channel Occupancy Time COT sharing indication information; and determining, according to the COT sharing indication information, time frequency resources used by a user equipment when the user equipment shares COT with other user equipment.

According to another aspect of the present disclosure, a computer readable storage medium is provided. The computer readable storage medium includes executable computer instructions that, when executed by a computer, cause the computer to perform the wireless communication method according to the present disclosure.

With the user equipment, the network side equipment, the wireless communication methods and the computer readable storage medium according to the present disclosure, the user equipment may send COT sharing indication information to other user equipment. The COT sharing indication information includes time frequency resources used by the other user equipment when the user equipment shares COT with the other user equipment. In this way, user equipments can share COT with each other to support COT sharing in D2D communication mode, so as to properly make use of a channel and simplify a process of using an unauthorized frequency band in D2D communication.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings.

Figure 1:
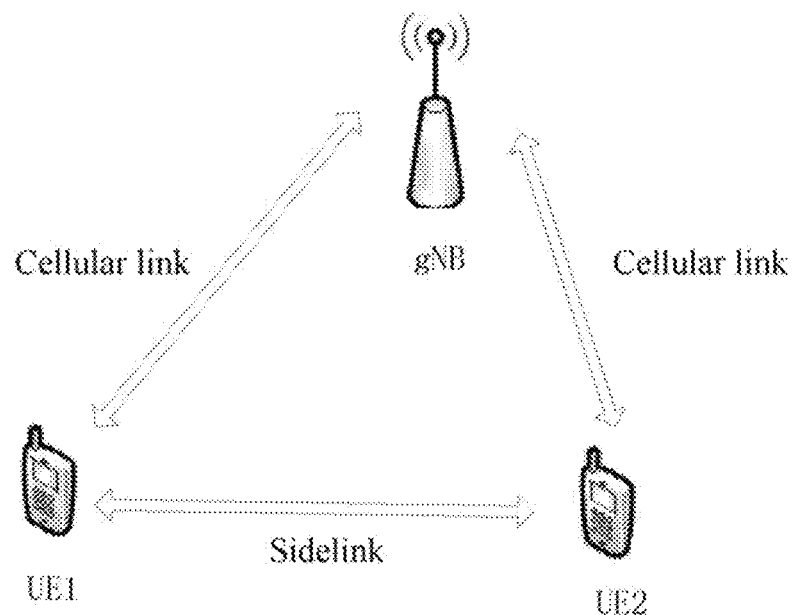
FIG. 1 is a schematic diagram of an application scenario according to an embodiment of the present disclosure.

Although the present disclosure is susceptible to various modifications and substitutions, specific embodiments thereof are shown in the drawings as examples and are described in detail herein. However, it should be understood that the description of specific embodiments herein is not intended to limit the present disclosure into a disclosed specific form. Instead, the present disclosure aims to cover all modifications, equivalents and substitutions within the spirit and the scope of the present disclosure. It should be noted that, corresponding reference numerals indicate corresponding components throughout the drawings.

DETAILED DESCRIPTION OF EMBODIMENTS

Now, examples of the present disclosure are described more fully with reference to the drawings. The following description is merely illustrative in nature and is not intended to limit the present disclosure and application or use.

Exemplary embodiments are provided so that the present disclosure can become exhaustive and the scope of the present disclosure can be fully conveyed to those skilled in the art. Examples of various specific details such as specific components, devices, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

Exemplary embodiments are described in the following order:
1. Description of a scenario
2. Configuration example of a user equipment
3. Configuration example of a network side equipment
4. Another configuration example of the user equipment
5. Method embodiment
6. Application example 1. Description of a Scenario FIG. 1 is a schematic diagram showing an application scenario of the present disclosure. As shown in FIG. 1, a wireless communication system includes a network side equipment gNB (a node B in a 5G system) and two user equipments: a UE1 and a UE2. The gNB communicates with each of the UE1 and the UE2 through a conventional cellular link. In addition, D2D communication may be performed between the UE1 and the UE2 through a sidelink. In the conventional COT sharing scheme, the UE1 may share COT with the gNB, that is, the UE1 may transmit data to the gNB by sharing time frequency resources in COT used by the gNB to transmit data to the UE1. Similarly, the UE2 may share COT with the gNB. In FIG. 1, since the UE1 and the UE2 may communicate with each other through the sidelink, the conventional COT sharing scheme is not efficient. It should be noted that FIG. 1 only shows a case in which the UE1 transmits data in a form of unicast. In a practical scenario, the UE1 may further transmit data in a form of multicast or in a form of broadcast. In addition, more than two UEs may be included within coverage of the gNB. That is, the present disclosure is applicable to all scenarios in which D2D communication is performed using an unauthorized frequency band.

For such scenario, a user equipment and a network side equipment in a wireless communication system, a wireless communication method performed by a user equipment in the wireless communication system, a wireless communication method performed by a network side equipment in the wireless communication system, and a computer readable storage medium are provided according to the present disclosure, to share COT by the UE1 and the UE2 (or by more than two UEs). In this way, COT sharing is supported in D2D communication mode, thereby properly making use of a channel and simplifying a process of using an unauthorized frequency band in D2D communication.

The wireless communication system according to the present disclosure may be a 5G New Radio (NR) communication system.

The network side equipment according to the present disclosure may be any type of Transmit and Receive Port (TRP), or a base station device such as an eNB and a gNB.

The user equipment according to the present disclosure may be a mobile terminal (such as a smartphone, a tablet personal computer (PC), a notebook PC, a portable game terminal, a portable/dongle mobile router and a digital camera device) or a vehicle terminal (such as a vehicle navigation device). The user equipment may further be implemented as a terminal performing machine to machine (M2M) communication (which is also referred to as a machine type communication (MTC) terminal). In addition, the user equipment may further be a wireless communication module (such as an integrated circuitry module including a single wafer) mounted on each of the above terminals.

2. Configuration Example of a User Equipment

Figure 2:
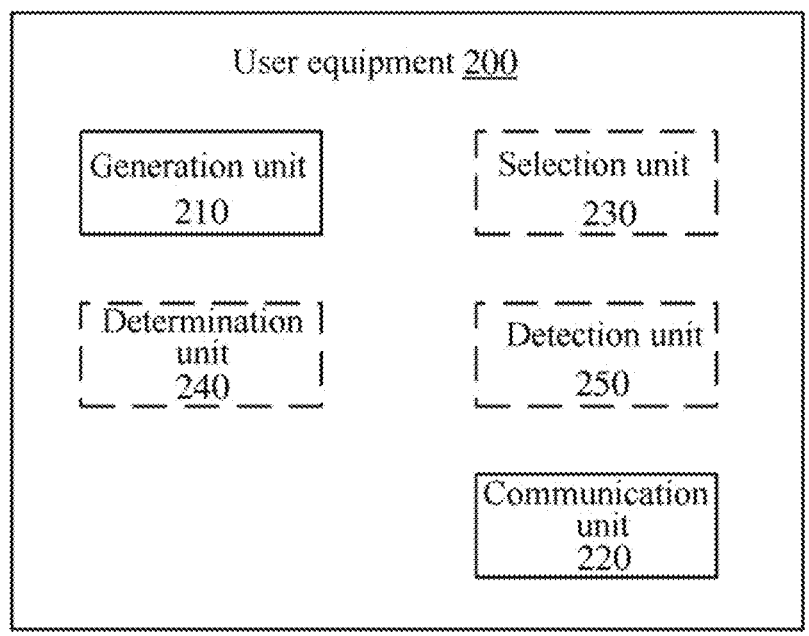
FIG. 2 is a block diagram showing a configuration example of a user equipment according to an embodiment of the present disclosure.

FIG. 2 is a block diagram showing a configuration example of a user equipment 200 according to an embodiment of the present disclosure. The user equipment 200 herein may be a user equipment first transmitting data in D2D communication, that is, a user equipment transmitting COT sharing indication information, such as the UE1 shown in FIG. 3 to FIG. 10, FIG. 12, and FIG. 13.

As shown in FIG. 2, the user equipment 200 may include a generation unit 210 and a communication unit 220.

Here, units of the user equipment 200 may be included in processing circuitry. It should be noted that the user equipment 200 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to the embodiments of the present disclosure, the generation unit 210 may generate COT sharing indication information. Here, the COT sharing indication information includes time frequency resources used by other user equipment when the user equipment 200 shares COT with the other user equipment.

According to the embodiments of the present disclosure, COT sharing refers to that the user equipment 200 shares COT with other user equipment. That is, two or more user equipments share COT with each other. In addition, the user equipments sharing COT with each other may be user equipments performing D2D communication, that is, the user equipment 200 is a transmitter in D2D communication and the other user equipment is a receiver in the D2D communication. Alternatively, the user equipment 200 is a receiver in the D2D communication and the other user equipment is a transmitter in the D2D communication. Generally, the COT sharing indication information is generated by the user equipment that transmits data first. In other words, although the user equipment 200 has the same structure as the other user equipment, the user equipment 200 transmits data first, such that the user equipment 200 generates the COT sharing indication information. Furthermore, user equipments sharing COT with each other may be located within service coverage of one network side equipment.

According to the embodiments of the present disclosure, the user equipment 200 sharing COT with the other user equipment means that the other user equipment may transmit data to the user equipment 200 by sharing COT that is used by the user equipment 200 to transmit data to the other user equipment. That is, frequency resources used by the other user equipment to transmit data to the user equipment 200 may be the same as frequency resources used by the user equipment 200 to transmit data to the other user equipment. In addition, time domain resources used by the other user equipment to transmit data to the user equipment 200 and time domain resources used by the user equipment 200 to transmit data to the other user equipment are within MCOT of the user equipment 200.

According to the embodiments of the present disclosure, the user equipment 200 may transmit the COT sharing indication information to the other user equipment through the communication unit 220.

It can be seen that the user equipment 200 according to the embodiments of the present disclosure may transmit the COT sharing indication information to the other user equipment. The COT sharing indication information includes time frequency resources used by the other user equipment when the user equipment 200 shares COT with the other user equipment. In this way, user equipments can share COT with each other, to support COT sharing in D2D communication mode, thereby properly making use of a channel and simplifying a process of using an unauthorized frequency band in D2D communication.

According to the embodiments of the present disclosure, the COT sharing indication information includes time resources and frequency resources that may be used by the other user equipment when the user equipment 200 shares COT with the other user equipment. Here, the frequency resources may indicate frequency information of a channel, a frequency band and the like that may be used by the other user equipment when the user equipment 200 shares COT with the other user equipment, that is, frequency resources that may be used by the other user equipment when the other user equipment transmits data to the user equipment 200. Preferably, the frequency resources may indicate frequency resources that may be used by the user equipment 200 when the user equipment 200 transmits data to the other user equipment. The time resources may indicate a start time and an end time of time resources used by the other user equipment when the user equipment 200 shares COT with the other user equipment, that is, a start time and an end time of the time resources that may be used by the other user equipment when the other user equipment transmits data to the user equipment 200. For example, the time resources may indicate a start time and an end time of an MCOT of the user equipment 200, or indicate a start time and an end time of a portion of the MCOT, that is, a start time and an end time that definitely indicate the other user equipment to transmit data to the user equipment 200, which is not limited in the present disclosure. That is, when the other user equipment receives the COT sharing indication information, it is determined that the other user equipment shares COT with the user equipment 200, and the time resources and frequency resources to be used in COT sharing are determined.

According to the embodiments of the present disclosure, the user equipment 200 may carry the COT sharing indication information by sidelink control information (SCI).

On a sidelink, the user equipment may acquire resources in two modes. In one mode, the user equipment acquires resources through dynamic indication performed by a network side equipment, that is, the network side equipment has authority to determine resources to be used, and this mode is referred to as mode 1. In another mode, the user equipment acquires resources by selecting resources from a resource pool, that is, the user equipment has authority to determine resources to be used, and this mode is referred to as mode 2.

According to the embodiments of the present disclosure, the user equipment 200 may acquire resources used for transmitting data by the user equipment 200 in the above two modes.

According to the embodiments of the present disclosure, the user equipment 200 may transmit resource request information to a network side equipment serving the user equipment 200 through the communication unit 220, to request resources for transmitting data by the user equipment 200. Here the resource request information, for example, may include information of a cache condition of the user equipment 200, one or more destination user equipments, and the like.

According to the embodiments of the present disclosure, the user equipment 200 may receive resource scheduling information from the network side equipment through the communication unit 220. Here, the resource scheduling information may include resources for transmitting data by the user equipment 200, that is, resources used for transmitting data unrelated to COT sharing, including time domain resources and frequency resources. The resource scheduling information may further include scheduling information of the network side equipment on COT sharing between the user equipment 200 and the other user equipment, that is, the resource scheduling information may further include time frequency resources used by the user equipment 200 and time frequency resources used by the other user equipment when the other user equipment shares COT with the user equipment 200.

According to the embodiments of the present disclosure, the user equipment 200 may receive the resource scheduling information from the network side equipment through Downlink Control Information (DCI).

According to the embodiments of the present disclosure, the generation unit 210 may generate COT sharing indication information according to the resource scheduling information received from the network side equipment. That is, the generation unit 210 may determine, according to the resource scheduling information received from the network side device, scheduling information of the network side equipment on COT sharing of the other user equipment, so as to generate COT sharing indication information including time frequency resources that may be used by the other user equipment when the other user equipment shares COT with the user equipment 200.

According to the embodiments of the present disclosure, the user equipment 200 may adjust, according to an access condition of the user equipment 200 on an unauthorized channel, the time frequency resources used by the other user equipment when the other user equipment shares COT with the user equipment 200. For example, the user equipment 200 may perform channel detection on the unauthorized channel and adjust, according to a result of the channel detection, the time frequency resources used by the other user equipment when the other user equipment shares COT with the user equipment 200. Here, time resources used by the other user equipment when the other user equipment shares COT with the user equipment 200 are mainly adjusted. That is, the generation unit 210 may not only generate COT sharing indication information according to the resource scheduling information received from the network side equipment, but also generate COT sharing indication information according to the result of the channel detection performed by the user equipment 200.

Figure 3:
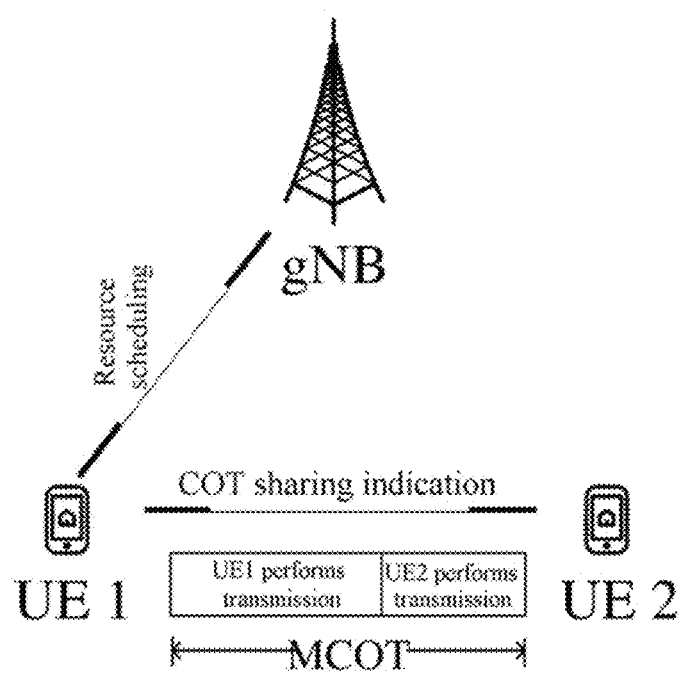
FIG. 3 is a schematic diagram showing a COT sharing process according to an embodiment of the present disclosure.

FIG. 3 is a schematic diagram showing a COT sharing process according to an embodiment of the present disclosure. In FIG. 3, it is assumed that a UE1 and a UE2 perform D2D communication and that the UE1 transmits data first. As shown in FIG. 3, the UE1 may receive resource scheduling information from a gNB and determine, according to the resource scheduling information, time frequency resources used by the UE2 when the UE1 shares COT with the UE2. The UE1 may further transmit COT sharing indication information to the UE2. The COT sharing indication information includes time frequency resources used by the UE2 when the UE2 shares COT with the UE1. Furthermore, as shown in FIG. 3, a MCOT of the UE1 is divided into two parts, a former part is used by the UE1 to transmit data to the UE2, and a latter part is used by the UE2 to transmit data to the UE1. It can be seen that the gNB may transmit scheduling information about COT sharing to a user equipment transmitting data first, and the user equipment transmitting data first transmits the COT sharing indication information to other user equipment.

Figure 4:
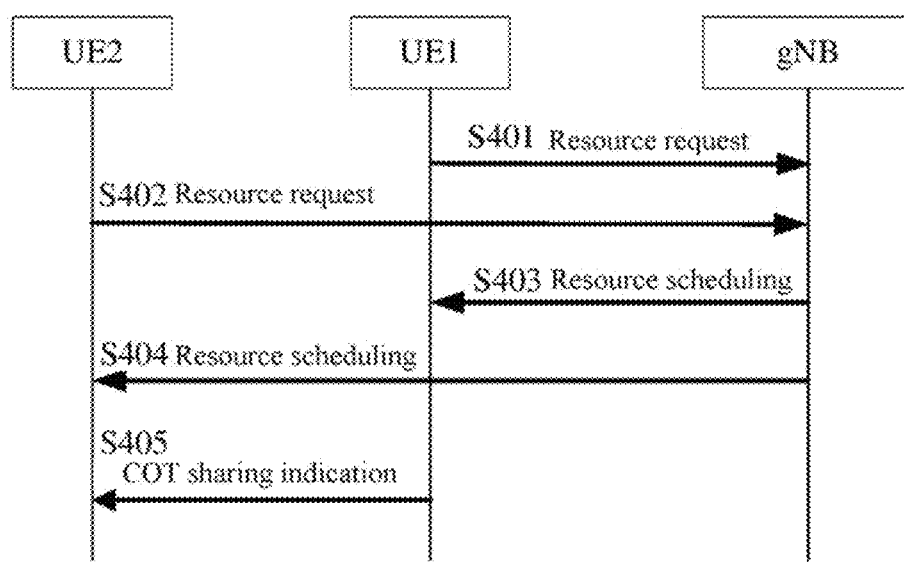
FIG. 4 is a flowchart showing signaling of a COT sharing process according to an embodiment of the present disclosure.

FIG. 4 is flowchart showing signaling of a COT sharing process according to an embodiment of the present disclosure. In FIG. 4, it is assumed that a UE1 and a UE2 perform D2D communication and that the UE1 transmits data first. As shown in FIG. 4, in step S401, the UE1 transmits resource request information to a gNB to request resources for transmitting data by the UE1. In step S402, the UE2 transmits resource request information to the gNB to request resources for transmitting data by the UE2. Next, in step S403, the gNB transmits resource scheduling information to the UE1. The resource scheduling information includes the resources for transmitting data by the UE1, that is, resources for transmitting data unrelated to COT sharing. The resource scheduling information may further include scheduling information about COT sharing between the UE1 and the UE2. In step S404, the gNB transmits resource scheduling information to the UE2. The resource scheduling information includes resources for transmitting data by the UE2, that is, resources for transmitting data unrelated to COT sharing. Next, in step S405, the UE1 determines, according to the resource scheduling information from the gNB, time frequency resources used by the UE2 when the UE2 shares COT with the UE1, so as to transmit COT sharing indication information to the UE2.

According to the embodiments of the present disclosure, a user equipment (for example, the UE1 and the UE2 in FIG. 3 and FIG. 4) may receive the following four types of information: a) resource scheduling information received from a network side equipment through DCI, where the resource scheduling information includes resources for transmitting data by the user equipment, that is, resources unrelated to COT sharing; b) resource scheduling information received from other user equipment through SCI, where the resource scheduling information includes resources for transmitting data by the user equipment, that is, resources unrelated to COT sharing; c) scheduling information related to COT sharing and received from the other user equipment through SCI, that is, time frequency resources that may be used by the user equipment when the user equipment shares COT with the other user equipment; and d) scheduling information related to COT sharing and received from the network side equipment through DCI, that is, time frequency resources that may be used by the user equipment when the user equipment shares COT with the other user equipment. According to the embodiments of the present disclosure, the user equipment may transmit and receive data according to the above four types of information. Here, priorities of the above four types of information may be that a is higher than b, b is higher than c and c is higher than d.

It can be seen that according to the embodiments of the present disclosure, the user equipment transmitting data first may generate the COT sharing indication information and transmit the COT sharing indication information to the other user equipment, so that the other user equipment can receive the COT sharing indication information in a case that the other user equipment is disconnected from the network side equipment, thereby performing D2D communication. Furthermore, through indication of the user equipment transmitting data first, the other user equipment may quickly access a channel occupied by the user equipment transmitting data first, such that a connection between the other user equipment and the network side equipment can be rapidly restored.

According to the embodiments of the present disclosure, as shown in FIG. 2, the user equipment 200 may further include a selection unit 230. The selection unit 230 is configured to autonomously select resources from a resource pool. That is, the user equipment 200 acquires resources in the mode 2 described above. The generation unit 210 may further generate COT sharing indication information according to the autonomously selected resources.

Similarly, the COT sharing indication information includes time resources and frequency resources that may be used by the other user equipment when the user equipment 200 shares COT with the other user equipment. The time resource indicates the start time and the end time of time resources used by the other user equipment when the user equipment 200 shares COT with the other user equipment. For example, the time resources may indicate a start time and an end time of a MCOT of the user equipment 200. Alternatively, the time resources may indicate a start time and an end time of a portion of the MCOT, that is, the time resources may indicate a start time and an end time for the other user equipment to transmit data to the user equipment 200. In addition, the user equipment 200 may carry the COT sharing indication information through SCI.

Figure 5:
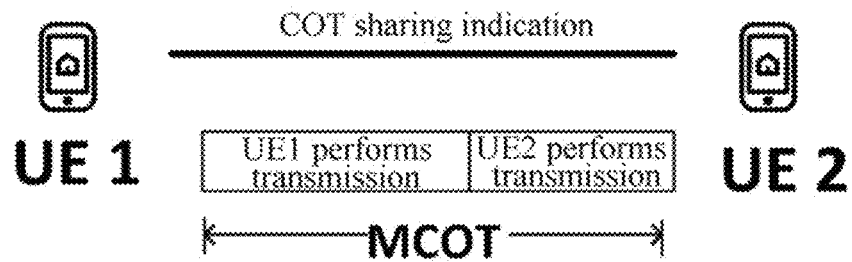
FIG. 5 is a schematic diagram showing a COT sharing process according to another embodiment of the present disclosure.

FIG. 5 is a schematic diagram showing a COT sharing process according to an embodiment of the present disclosure. In FIG. 5, it is assumed that a UE1 and a UE2 perform D2D communication and that the UE1 transmits data first. As shown in FIG. 5, the UE1 may transmit COT sharing indication information to the UE2 to indicate time frequency resources in COT sharing to the UE2. A MCOT of the UE1 is divided into two parts. One of the two parts is used for transmitting data by the UE1 and the other of the two parts is used for transmitting data by the UE2.

According to the embodiments of the present disclosure, the MCOT of the user equipment 200 may include multiple "uplink/downlink" switch points. Here, within the MCOT, each switching from the UE1 transmitting data to the UE2 to the UE2 transmitting data to the UE1 is referred to as an "uplink/downlink" switch. A process in which the UE1 transmitting data to the UE2 is switched to the UE2 transmitting data to the UE1 and then the UE2 transmitting data to the UE1 is switched to the UE1 transmitting data to the UE2 includes two "uplink/downlink" switches. That is, each switch from transmitting data by the user equipment 200 to receiving data by the user equipment 200, or each switch from receiving data by the user equipment 200 to transmitting data by the user equipment 200 is referred to as an "uplink/downlink" switch.

Figure 6:
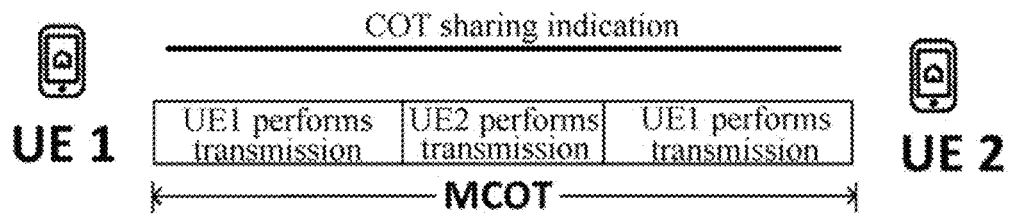
FIG. 6 is a schematic diagram showing a COT sharing process according to another embodiment of the present disclosure.

FIG. 6 is a schematic diagram showing a COT sharing process according to an embodiment of the present disclosure. In FIG. 6, it is assumed that a UE1 and a UE2 perform D2D communication and that the UE1 transmits data first. As shown in FIG. 6, the UE1 may transmit COT sharing indication information to the UE2, to indicate the time frequency resources in COT sharing to the UE2. A MCOT of the UE1 is divided into three parts. One of the three parts is used for transmitting data by the UE1. Another of the three parts is used for transmitting data by the UE2. The other of the three parts is used for transmitting data by the UE1. Here, FIG. 6 only shows an example in which the MCOT includes two "uplink/downlink" switch points. In a practical scenario, the MCOT of the UE1 may include more than two "uplink/downlink" switch points.

According to the embodiments of the present disclosure, in a case that the UE1 acquires resources in mode 2, the COT is shared between the UE1 and the UE2, without participation of the network side equipment, such that the COT sharing process is concise and the UE2 can quickly access the channel occupied by the UE1. In this case, since the UE2 does not acquire resources through scheduling performed by the network side equipment, data may not be transmitted according to the scheduling performed by the UE1. That is, the UE1 can not determine whether the UE2 uses the MCOT of the UE1 and the UE1 can not determine how many resources in the MCOT are used by the UE2.

According to the embodiments of the present disclosure, the user equipment 200 may receive, from the other user equipment and through the communication unit 220, COT use indication information about a use condition by the other user equipment with respect to time frequency resources. That is, the COT use indication information indicates a use condition by the other user equipment with respect to the time frequency resources indicated by the COT sharing indication information.

According to the embodiments of the present disclosure, as shown in FIG. 2, the user equipment 200 may further include a determination unit 240. The determination unit 240 is configured to determine, according to the COT use indication information received by the user equipment 200, a use condition by the other user equipment with respect to time frequency resources used by the other user equipment when the other user equipment shares COT with the user equipment 200.

According to the embodiments of the present disclosure, the determination unit 240 may determine, according to the COT use indication information, whether the other user equipment uses the time frequency resources indicated by the COT sharing indication information. For example, the COT use indication information may include 1 bit of information for indicating whether the other user equipment uses the time frequency resources indicated by the COT sharing indication information.

According to the embodiments of the present disclosure, the determination unit 240 may further determine, according to the COT use indication information, time frequency resources remaining within the COT. For example, the COT use indication information may include multiple bits of information for representing the time frequency resources remaining within the COT.

According to the embodiments of the present disclosure, the COT use indication information may be flexibly set to indicate whether the other user equipment uses the time frequency resources indicated by the COT sharing indication information. In an embodiment, the COT use indication information may represent the time frequency resources remaining within the COT. Content of the COT use indication information is not limited in the present disclosure. For example, in a case that the other user equipment is not required to use the time frequency resources indicated by the COT sharing indication, the COT use indication information may carry an indication indicating that the other user equipment will not use the time frequency resources within the MCOT. In a case that the other user equipment is required to use the time frequency resources indicated by the COT sharing indication, the COT use indication information may carry time frequency resources remaining within the COT after the other user equipment uses the time frequency resources indicated by the COT sharing indication.

According to the embodiments of the present disclosure, in a case that there are resources remaining within the COT, the user equipment 200 may transmit data once again using the remaining resources. The data may be transmitted by the user equipment transmitting COT use indication information, or other user equipment than the user equipment 200 and the user equipment transmitting COT use indication information.

Furthermore, according to the embodiments of the present disclosure, a data service performed between the user equipment 200 and the other user equipment may support feedback or not support feedback. In a case that the data service performed between the user equipment 200 and the other user equipment supports feedback, the other user equipment may carry the COT use indication information by using feedback information. In a case that the data service between the user equipment 200 and the other user equipment does not support feedback, the other user equipment may carry the COT use indication information by using SCI.

As described above, according to the embodiments of the present disclosure, the user equipment 200 may receive COT use indication information from the other user equipment to acquire a use condition by the other user equipment with respect to resources within the COT, so as so transmit data using remaining resources in a case that there are resources remaining within the COT. In this way, a waste of resources caused in a case that the other user equipment does not use the resources within the COT can be avoided, and a possibility of multiple "uplink/downlink" switches within the MCOT of the user equipment 200 is realized.

Figure 7:
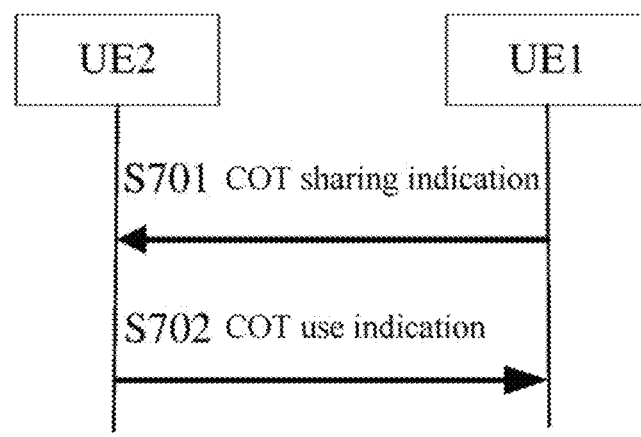
FIG. 7 is a flowchart showing signaling of a COT sharing process according to another embodiment of the present disclosure.

FIG. 7 is a flowchart showing signaling of a COT sharing process according to an embodiment of the present disclosure. In FIG. 7, it is assumed that a UE1 and a UE2 perform D2D communication and that the UE1 transmits data first. As shown in FIG. 7, in step S701, the UE1 transmits COT sharing indication information to the UE2. In an embodiment, in step S702, the UE2 transmits COT use indication information to the UE1.

According to the embodiments of the present disclosure, as shown in FIG. 2, the user equipment 200 may further include a detection unit 250. The detection unit 250 is configured to perform channel detection. The channel detection may be implemented in a manner of Listen before talk (LBT). In the manner of LBT, it is detected whether a channel is idle by performing Clear Channel Assessment (CCA) before the channel or a carrier is used. In a case that the channel is idle, the channel may be accessed. In a case that the channel is occupied, the channel cannot be accessed. In addition, the LBT may be a LBT process without a random backoff, a LBT process with a random backoff and a variable contention window size, a LBT process with a random backoff and a fixed contention window size, and the like, which is not limited in the present disclosure.

According to the embodiments of the present disclosure, after the user equipment 200 performs transmission between the user equipment 200 and the other user equipment, the detection unit 250 may perform channel detection to use the time frequency resources remaining within the COT.

That is, according to the embodiments of the present disclosure, in a case that the other user equipment does not transmit COT use indication information to the user equipment 200, there may be the following conditions. After performing the transmission between the user equipment 200 and the other user equipment, the user equipment 200 can not determine whether the other user equipment uses the resources within the COT, and the user equipment 200 intends to transmit data to the other user equipment once again or transmit data to a user equipment other than the other user equipment. In this case, the user equipment 200 may perform channel detection to acquire an opportunity of accessing a currently occupied channel once again.

According to the embodiments of the present disclosure, the detection unit 250 may perform channel detection within a predetermined time period after transmission between the user equipment 200 and the other user equipment is performed. Preferably, the detection unit 250 may perform the channel detection within a time range of 16 us to 25 us after transmission between the user equipment 200 and the other user equipment is performed. Preferably, the channel detection process may be a LBT process without a random backoff. In addition, the detection unit 250 may perform LBT once or more times to reduce a probability of collision with data transmission performed by the other user equipment.

As described above, according to the embodiments of the present disclosure, the user equipment 200 may perform channel detection to access the occupied channel once again. In this way, waste of resources caused in a case that the other user equipment does not use the resources within the COT can be avoided, and the possibility of multiple "uplink/downlink" switches within the MCOT of the user equipment 200 is realized.

As described above, whether the user equipment 200 acquires resources through scheduling of the network side equipment or the user equipment 200 autonomously selects resources, the user equipment 200 may transmit the COT sharing indication information including the time frequency resources used when the user equipment 200 shares COT with the other user equipment to the other user equipment. Here, the other user equipment may include one user equipment or multiple user equipments.

According to the embodiments of the present disclosure, the user equipment 200 may transmit data in a form of unicast or multicast. In a case that the other user equipment includes one user equipment, the user equipment 200 may perform data transmission with the other user equipment in a form of unicast. In addition, the user equipment 200 may share COT with the other user equipment.

According to the embodiments of the present disclosure, in a case that the other user equipment includes multiple user equipments, the user equipment 200 may perform data transmission with each of the multiple other user equipments in a form unicast, that is, each of the multiple other user equipments is not aware of another user equipment in the user equipments. For example, the other user equipments includes a UE2 and a UE3, and the user equipment 200 is a UE1. The UE1 performs data transmission with the UE2 in a form of unicast, and performs data transmission with the UE3 in a form of unicast, and the UE2 is not aware of the UE3 and the UE3 is not aware of the UE2. In this case, the COT sharing indication information may include time frequency resources used by each of the other user equipments when the user equipment 200 shares COT with the other user equipment. That is, the user equipment 200 may inform, through the COT sharing indication information, each of the other user equipments of frequency resources and time resources within the COT allocated to the other user equipment, where the time resources includes a start time and an end time.

According to the embodiments of the present disclosure, in a case that the other user equipment includes multiple user equipments, the user equipment 200 may perform data transmission with a portion of the other user equipments in a form of unicast, and in the other user equipments, there may be a pair of user equipments between which data transmission is performed in a form of unicast. For example, the other user equipments include a UE2 and a UE3, and the user equipment 200 is a UE1. The UE1 performs data transmission with the UE2 in a form of unicast., and the UE2 performs data transmission with the UE3 in a form of unicast. In this case, the UE1 may inform, through COT sharing indication information, the UE2 of frequency resources and time resources within the COT allocated to the UE2. Furthermore, the UE2 may inform, through COT sharing indication information, the UE3 of frequency resources and time resources within the COT allocated to the UE3, that is, the UE2 may share the time resources and frequency resources allocated to the UE2 with the UE3.

According to the embodiments of the present disclosure, in a case that the other user equipment includes multiple other user equipments, the user equipment may perform data transmission with the multiple other user equipments in a form of multicast, that is, the multiple other user equipments are aware of each other. In this case, the user equipment 200 may be a leader equipment of a user equipment group including the user equipment 200 and the multiple other user equipments, and the other user equipments may serve as member equipments, which is described in detail below.

According to the embodiments of the present disclosure, the COT sharing indication information may include time frequency resources used by each of the other user equipment when the user equipment 200 shares COT with the other user equipment. The COT sharing indication information may further include time frequency resources used when two other user equipments share COT with each other. That is, the leader equipment may share time frequency resources within the COT with the member equipments, and the member equipments may share time frequency resources within the COT with each other.

According to the embodiments of the present disclosure, the user equipment 200 may acquire resources in any one of the mode 1 or the mode 2 that are described above, such that the user equipment 200 may share the acquired time frequency resources within the COT with multiple other user equipments.

According to the embodiments of the present disclosure, the user equipment 200 may receive resource request information from each of the multiple other user equipments through the communication unit 220 and allocate, according to the resource request information, time frequency resources within the COT to each of the multiple other user equipments. Therefore, the COT sharing indication information generated by the generation unit 210 may include time frequency resources used for performing data transmission by each pair of user equipments (including the user equipment 200 and the other user equipment, or including two other user equipments) required to communicate with each other.

According to the embodiments of the present disclosure, a process of transmitting data by the user equipment 200 and a process of transmitting data by the other user equipment may be performed in a manner of time-division multiplexing within the MCOT, that is, the two processes may be performed respectively at different times within the MCOT. Furthermore, processes of transmitting data by the other user equipments may be performed in a manner of frequency-division multiplexing within the MCOT, that is, different processes may be performed by using different frequencies in the MCOT.

According to the embodiments of the present disclosure, the user equipment 200 may further reserve a part of time frequency resources within the MCOT for performing a data service for which a resource request is not transmitted in advance. For example, the other user equipment may be required to transmit some sudden service without transmitting resource request information to the user equipment 200 in advance. In this case, the other user equipment may use the time frequency resources reserved by the user equipment 200 within the MCOT. Preferably, the other user equipment may acquire the reserved resources through competition. In addition, the user equipment 200 may inform all member equipments of the reserved resources in a form of broadcast.

According to the embodiments of the present disclosure, the user equipment 200 may carry the above COT sharing indication information through SCI in broadcast.

Figure 8:
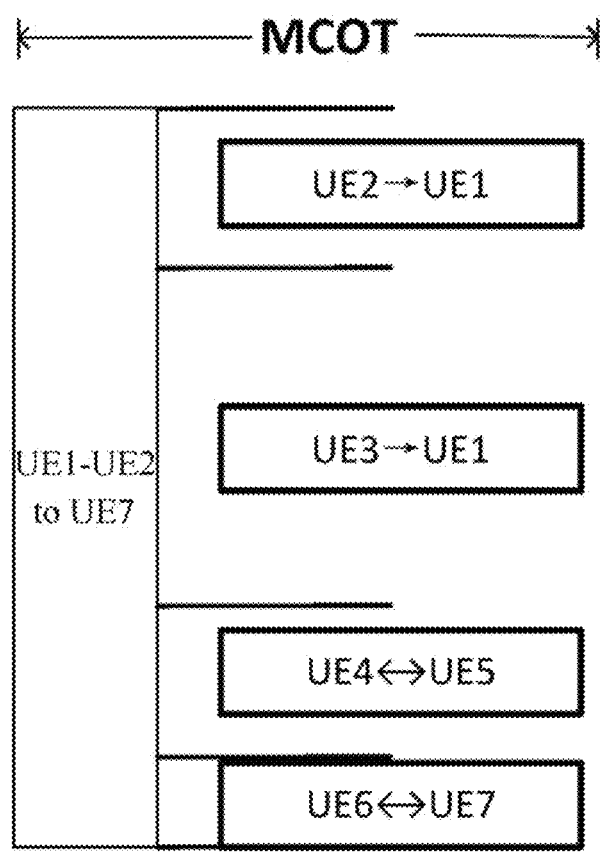
FIG. 8 is a schematic diagram showing a COT sharing process according to another embodiment of the present disclosure.

FIG. 8 is a schematic diagram showing a COT sharing process according to an embodiment of the present disclosure. In FIG. 8, a UE1 to a UE7 form a user equipment group, where the UE1 serves as a leader equipment and the UE2 to the UE7 serve as member equipments. As shown in FIG. 8, the UE1 may transmit data to the UE2 to the UE7 in a form of broadcast using a part of resources within the MCOT. Further, the UE1 may divide the resources remaining within the MCOT into several parts in response to a request from the member equipments, for performing data transmission from the UE2 to the UE1, data transmission from the UE3 to the UE1, data transmission between the UE4 and the UE5, and data transmission between the UE6 to the UE7.

Figure 9:
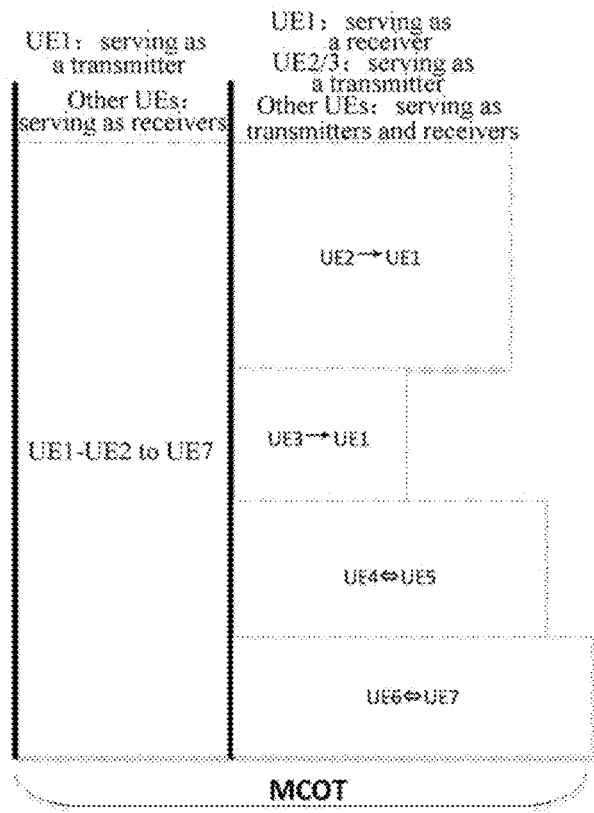
FIG. 9 is a schematic diagram showing a COT sharing process according to another embodiment of the present disclosure.

FIG. 9 is a schematic diagram showing a COT sharing process according to an embodiment of the present disclosure. In FIG. 9, a UE1 to a UE7 form a user equipment group, where the UE1 serves as a leader equipment, and the UE2 to the UE7 serve as member equipments. As shown in FIG. 9, the UE1 may transmit data to the UE2 to the UE7 in a form of broadcast using a part of resources within the MCOT. During such process, the UE1 serves as a transmitter and the UE2 to the UE7 serve as receivers. Further, the UE1 may divide the resources remaining within the MCOT into several parts in response to a request from the member equipments, for performing data transmission from the UE2 to the UE1, data transmission from the UE3 to the UE1, data transmission between the UE4 and the UE5, and data transmission between the UE6 to the UE7. In this process, the UE1 serves as a receiver, the UE2 and the UE3 serve as transmitters, and the UE4 to the UE7 serve as transmitters and receivers.

Figure 10:
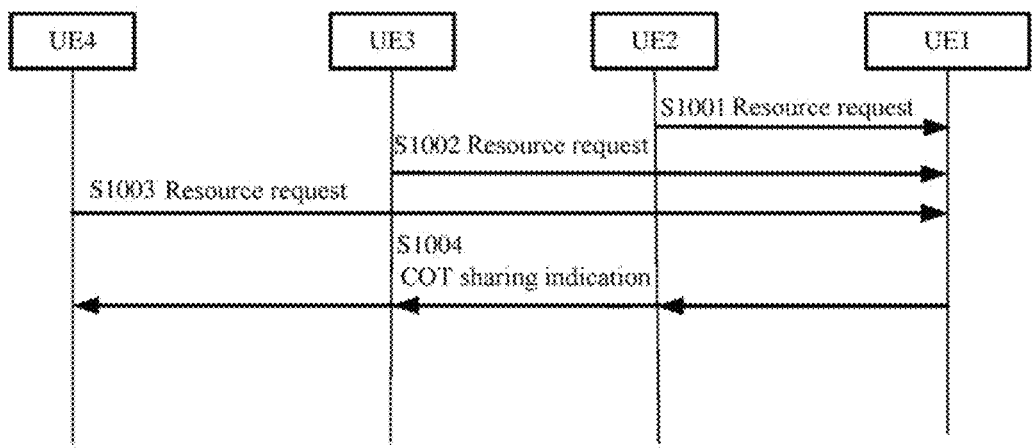
FIG. 10 is a flowchart showing signaling of a COT sharing process according to another embodiment of the present disclosure.

FIG. 10 is a flowchart showing signaling of a COT sharing process according to an embodiment of the present disclosure. In FIG. 10, a UE1 to a UE4 form a user equipment group, where the UE1 serves as a leader equipment, and the UE2 to the UE4 serve as member equipments. As shown in FIG. 10, in step S1001, the UE2 transmits resource request information to the UE1. In step S1002, the UE3 transmits resource request information to the UE1. In step S1003, the UE4 transmits resource request information to the UE1. In this way, the UE1 determines, according to the resource request information from the UE2 to the UE4, time frequency resources to be used in performing data transmission by each pair of user equipments required to communicate with each other, so as to generate COT sharing indication information. Next, in step S1004, the UE1 transmits the COT sharing indication information to user equipments from the UE2 to the UE4. Here, the UE1 may transmit the COT sharing indication information in a form of broadcast through SCI.

It can be seen that according to the embodiments of the present disclosure, the user equipment 200 may share resources within the COT with one other user equipment or multiple other user equipments, so as to use time frequency resources in the COT as much as possible.

As described above, the user equipment 200 according to the embodiments of the present disclosure may transmit COT sharing indication information to the other user equipment. The COT sharing indication information includes time frequency resources used by the other user equipment when the user equipment shares COT with the other user equipment. In addition, whether the user equipment 200 acquires resources through the scheduling of the network side equipment or through autonomous selection, the user equipment 200 may share the acquired resources with the other user equipment. Furthermore, the user equipment 200 may further share the resources within the COT with multiple other user equipments, such that multiple "uplink/downlink" switches within the MCOT are realized, and it is possible to share the resources within the COT by the user equipment group. In summary, according to the embodiments of the present disclosure, user equipments may share COT with each other, such that COT sharing is supported in the D2D communication mode, thereby properly making use of a channel and simplifying a process of using an unauthorized frequency band in D2D communication.

3. Configuration Example of a Network Side Equipment

Figure 11:
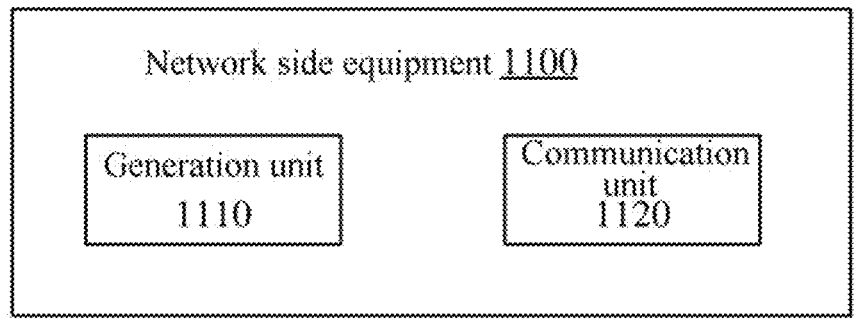
FIG. 11 is a block diagram showing a configuration example of a network side equipment according to an embodiment of the present disclosure.

FIG. 11 is a block diagram showing a structure of a network side equipment 1100 in a wireless communication system according to an embodiment of the present disclosure. The network side equipment herein may be, for example, the gNB in FIGS. 1, 3, 4, 12 and 13. As shown in FIG. 11, the network side equipment 1100 may include a generation unit 1110 and a communication unit 1120.

Here, units of the network side equipment 1100 may be included in processing circuitry. It should be noted that the network side equipment 1100 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to the embodiments of the present disclosure, the generation unit 1110 may generate COT sharing indication information. Here, the COT sharing indication information includes time frequency resources used by a first user equipment served by the network side equipment 1100 when the first user equipment shares COT with a second user equipment served by the network side equipment 1100.

According to the embodiments of the present disclosure, COT sharing refers to that the first user equipment shares COT with the second user equipment. That is, the user equipments share the COT with each other. In addition, the COT may be shared by user equipments that perform D2D communication. That is, the first user equipment serves as a transmitter in the D2D communication and the second user equipment serves as a receiver in the D2D communication. Alternatively, the first user equipment serves as a receiver in the D2D communication and the second user equipment serves as a transmitter in the D2D communication. Further, the first user equipment and the second user equipment sharing COT with each other may be both within the service coverage of the network side equipment 1100. In addition, "first" and "second" are only serial numbers of the user equipments, which are used for distinguishing a user equipment from another and do not limit the numbers and the structures of the user equipments.

According to the embodiments of the present disclosure, the network side equipment 1100 may transmit the COT sharing indication information to the first user equipment through the communication unit 1120.

It can be seen that the network side equipment 1100 according to the embodiments of the present disclosure may transmit the COT sharing indication information to a user equipment within the coverage of the network side equipment 1100. The COT sharing indication information includes time frequency resources used by the user equipment when the user equipment shares COT with other user equipment. In this way, user equipments may share COT with each other, such that COT sharing is supported in D2D communication mode, thereby properly making use of a channel and simplifying a process of using an unauthorized frequency band in D2D communication.

According to the embodiments of the present disclosure, the COT sharing indication information includes time resources and frequency resources that are used by the first user equipment when the first user equipment and the second user equipment share COT with each other. Here, the frequency resources may indicate frequency information of a channel, a frequency band and the like that may be used by the first user equipment when the first user equipment and the second user equipment share COT with each other. The time resources indicate a start time and an end time of the time resources that may be used by the first user equipment when the first user equipment and the second user equipment share COT with each other. For example, the time resources may indicate a start time and an end time of a MCOT of a user equipment transmits data first in the first user equipment and the second user equipment. Alternatively, the time resources may indicate a start time and an end time of a portion of the MCOT, that is, a start time and an end time for the first user equipment to transmit data to the second user equipment, which is not limited in the present disclosure. That is, on reception of the COT sharing indication information by the first user equipment, it is determined that the second user equipment and the first user equipment share COT with each other, and it is determined the time resources and the frequency resources to be used by the first user equipment in COT sharing.

According to the embodiments of the present disclosure, the network side equipment 1100 may carry the COT sharing indication information that is transmitted to the first user equipment (may be referred to as COT sharing indication information of the first user equipment) through DCI.

As described above, the first user equipment may acquire resources for transmitting data by the first user equipment in the mode 1. In this case, the network side equipment 1100 may receive resource request information from the first user equipment through the communication unit 1120. Here, the resource request information may include, for example, information of a cache condition of the first user equipment, one or more destination user equipments and the like. Further, the generation unit 1110 may generate, according to the resource request information from the first user equipment, resource scheduling information of the first user equipment. The resource scheduling information includes COT sharing indication information.

According to the embodiments of the present disclosure, the resource scheduling information generated by the generation unit 1110 may include resources for transmitting data by the first user equipment, that is, resources for transmitting data unrelated to COT sharing. The resource scheduling information includes time resources and frequency resources. The resource scheduling information may further include scheduling information of the network side equipment 1100 on COT sharing between the first user equipment and the other user equipment, that is, the resource scheduling information includes time frequency resources used by the first user equipment when the first user equipment and the second user equipment share COT with each other.

According to the embodiments of the present disclosure, the network side equipment 1100 may perform a similar operation on the second user equipment, to generate COT sharing indication information of the second user equipment. That is, the network side equipment 1100 may receive resource request information from the second user equipment through the communication unit 1120. The generation unit 1110 may generate the resource scheduling information of the second user equipment according to the resource request information from the second user equipment. The resource scheduling information includes COT sharing indication information of the second user equipment. The COT sharing indication information of the second user equipment includes time frequency resources used by the second user equipment when the first user equipment and the second user equipment share COT with each other. This process is similar to the process of generating the COT sharing indication information of the first user equipment and is not repeated herein.

According to the embodiments of the present disclosure, the network side equipment 1100 may receive resource request information from multiple user equipments within the service coverage of the network side equipment, to determine a communication requirement of each of the multiple user equipments according to the resource request information from the user equipment, so as to support COT sharing between the user equipments, that is, determine a COT sharing scheme for the user equipments.

According to the embodiments of the present disclosure, the network side equipment 1100 may transmit COT sharing indication information of the second user equipment to the first user equipment. Here, the first user equipment may be a user equipment that transmits data first in D2D communication between the first user equipment and the second user equipment. In this way, the network side equipment 1100 may transmit the COT sharing indication information of the first user equipment and the COT sharing indication information of the second user equipment to the first user equipment, for the first user equipment to transmit the COT sharing indication information of the second user equipment to the second user equipment.

According to the embodiments of the present disclosure, the network side equipment 1100 may transmit COT sharing indication information of the second user equipment to the second user equipment through the communication unit 1120. For example, the network side equipment 1100 may carry the COT sharing indication information that is transmitted to the second user equipment through DCI.

Figure 12:
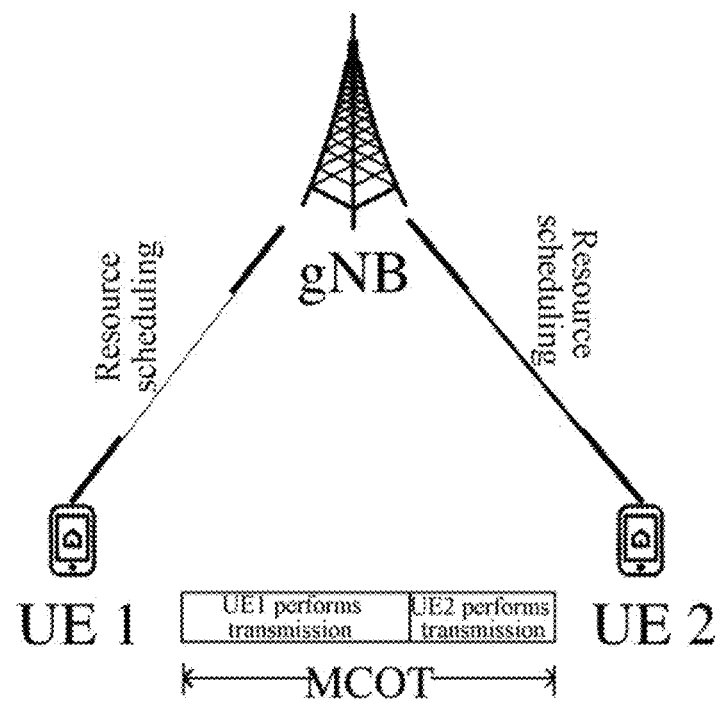
FIG. 12 is a schematic diagram showing a COT sharing process according to another embodiment of the present disclosure.

FIG. 12 is a schematic diagram showing a COT sharing process according to an embodiment of the present disclosure. In FIG. 12, D2D communication is performed between a UE1 and a UE2. The UE1 and the UE2 are both located within a service coverage of a gNB. As shown in FIG. 12, each of the UE1 and the UE2 may transmit resource request information to the gNB and receive resource scheduling information from the gNB to obtain its COT sharing indication information. A MCOT of the UE1 is divided into two parts. The former of the two parts is used for transmitting data by the UE1, and the latter of the two parts is used for transmitting data by the UE2.

Figure 13:
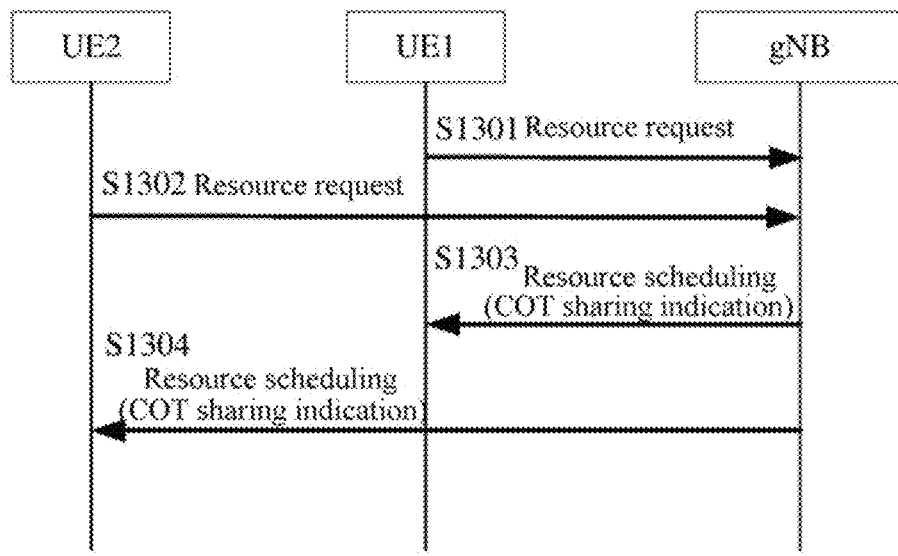
FIG. 13 is a flowchart showing signaling of a COT sharing process according to another embodiment of the present disclosure.

FIG. 13 is a flowchart showing signaling of a COT sharing process according to an embodiment of the present disclosure. In FIG. 13, D2D communication is performed between a UE1 and a UE2. The UE1 and the UE2 are both located within the service coverage of a gNB. As shown in FIG. 13, in step S1301, the UE1 transmits resource request information to the gNB. In step S1302, the UE2 transmits resource request information to the gNB. Next, according to the resource requests from the UE1 and the UE2, the gNB determines that the UE1 and the UE2 are required to share COT with each other and determines time frequency resources respectively used by the UE1 and the UE2. Next, in step S1303, the gNB transmits resource scheduling information to the UE1. The resource scheduling information includes COT sharing indication information of the UE1, such that the UE1 determines time frequency resources used in COT sharing. In step S1304, the gNB transmits resource scheduling information to the UE2. The resource scheduling information includes COT sharing indication information of the UE2, such that the UE2 determines time frequency resources used in COT sharing.

As described above, according to the embodiments of the present disclosure, the network side equipment 1100 may transmit COT sharing indication information to each user equipment through the DCI, thereby reducing the delay of scheduling the user equipment and reducing instruction content in the SCI, causing the SCI to be concise.

It can be seen that the network side equipment 1100 according to the embodiments of the present disclosure transmits COT sharing indication information to the user equipment within the service coverage of the network side equipment 1100. The COT sharing indication information includes time frequency resources used when the user equipment shares COT with other user equipment. In this way, user equipments may share COT with each other to support COT sharing in D2D communication mode, so as to properly make use of a channel and simplify a process of using an unauthorized frequency band in D2D communication.

The network side equipment 1100 according to the embodiments of the present disclosure may serve the user equipment 200. Therefore, all embodiments of the user equipment 200 described above are applicable to the network side equipment 1100.

4. Another Configuration Example of the User Equipment

Figure 14:
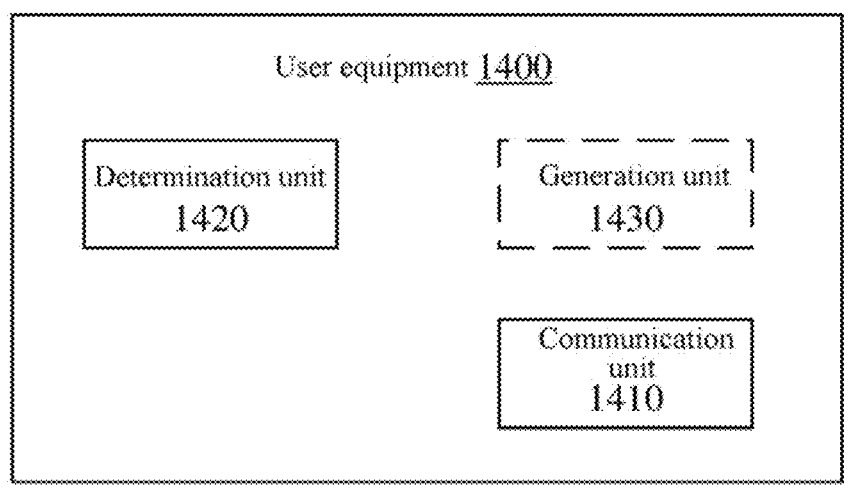
FIG. 14 is a block diagram showing a configuration example of a user equipment according to another embodiment of the present disclosure.

FIG. 14 is a block diagram showing a configuration example of a user equipment 1400 according to an embodiment of the present disclosure. The user equipment 1400 herein may be a user equipment that receives COT sharing indication information, for example, the UE1 and the UE2 shown in FIG. 3 to FIG. 10, FIG. 12 and FIG. 13. Preferably, the user equipment 1400 may be a user equipment that receives data first in D2D communication, for example, the UE2 shown in FIG. 3 to FIG. 10, FIG. 12 and FIG. 13.

As shown in FIG. 14, the user equipment 1400 may include a communication unit 1410 and a determination unit 1420.

Here, units of the user equipment 1400 may be included in processing circuitry. It should be noted that the user equipment 1400 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to the embodiments of the present disclosure, the user equipment 1400 may receive COT sharing indication information through the communication unit 1410.

According to the embodiments of the present disclosure, the determination unit 1420 may determine, according to the COT sharing indication information, time frequency resources used by the user equipment 1400 when the user equipment 1400 shares COT with other user equipment.

As described above, the user equipment 1400 according to the embodiments of the present disclosure may acquire the time frequency resources used by the user equipment 1400 when the user equipment 1400 shares COT with the other user equipment, to share COT by user equipments, so as to support COT sharing in D2D communication mode, thereby properly making use of a channel and simplifying a process of using an unauthorized frequency band in D2D communication.

According to the embodiments of the present disclosure, the determination unit 1420 may determine, according to the COT sharing indication information, frequency resources used by the user equipment 1400 when the user equipment 1400 shares COT with the other user equipment. The determination unit 1420 may further determine, according to the COT sharing indication information, a start time and an end time of the time resources used by the user device 1400 when the user equipment 1400 shares the COT with the other user equipment.

According to the embodiments of the present disclosure, the user equipment 1400 may receive COT sharing indication information of the user equipment 1400 from the other user equipment. For example, the user equipment 1400 may receive the COT sharing indication information through SCI. In this case, the other user equipment may be a user equipment that transmits data first in D2D communication between the user equipment 1400 and the other user equipment. Further, the other user equipment may generate, according to the resources autonomously selected by the other user equipment, COT sharing indication information to be transmitted to the user equipment 1400, and may also generate the COT sharing indication information to be transmitted to the user equipment 1400 according to the scheduling of the network side equipment, which is described in detail above and is not repeated herein.

According to the embodiments of the present disclosure, as shown in FIG. 14, the user equipment 1400 may further include a generation unit 1430. The generation unit 1430 is configured to generate COT use indication information about a use condition by the user equipment 1400 with respect to the time frequency resources indicated by the COT sharing indication information. The user equipment 1400 may further transmit COT use indication information to the other user equipment through the communication unit 1410.

According to the embodiments of the present disclosure, the COT use indication information indicates whether the user equipment 1400 uses the time frequency resources. For example, the COT use indication information may include 1 bit of information for indicating whether the user equipment 1400 uses the time frequency resources indicated by the COT sharing indication information.

According to the embodiments of the present disclosure, the COT use indication information may further indicate time frequency resources remaining within the COT. For example, the COT use indication information may include multiple bits of information for indicating the time frequency resources remaining within the COT.

According to the embodiments of the present disclosure, the generation unit 1430 may flexibly set the COT use indication information to indicate whether the user equipment 1400 uses the time frequency resources indicated by the COT sharing indication information. In an embodiment, the COT use indication information may indicate the time frequency resources remaining within the COT. Content included in the COT use indication information is not limited in the present disclosure. For example, in a case that the user equipment 1400 is not required to use the time frequency resources indicated by the COT sharing indication, the COT use indication information may carry 1 bit of indication information indicating that the user equipment 1400 will no longer use the time frequency resources within the COT. In a case that the user equipment 1400 is required to use the time frequency resources indicated by the COT sharing indication, the COT use indication information may carry the time frequency resources remaining within the COT after the user equipment 1400 uses the time frequency resources indicated by the COT sharing indication.

In the field, in communication through a sidelink, a user equipment serving as a transmitter is required to transmit control information and data information to a user equipment serving as a receiver. The control information carries an indication of resources occupied by the data information, which includes indications of time resources and frequency resources that are occupied by the data information. In this way, the user equipment serving as a receiver demodulates the control information to acquire the time resources and the frequency resources that are occupied by the data information, so as to demodulate the data information.

According to the embodiments of the present disclosure, when the user equipment 1400 transmits the control information to the other user equipment, the user equipment 1400 shares time frequency resources within the COT with the other user equipment, that is, the frequency resources occupied by the user equipment 1400 for transmitting data information to the other user equipment are the same as frequency resources occupied by the other user equipment for transmitting data information to the user equipment 1400. Therefore, according to the embodiments of the present disclosure, the control information transmitted by the user equipment 1400 to the other user equipment may include only an indication of the time resources occupied by the data information without carrying an indication of the frequency resources occupied by the data information. In this way, control information transmitted by the user equipment 1400 is simplified.

According to the embodiments of the present disclosure, the user equipment 1400 may further receive COT sharing indication information from a network side equipment serving the user equipment 1400. In this case, the user equipment 1400 may be a user equipment that transmits data first in D2D communication between the user equipment 1400 and the other user equipment or a user equipment that receives data first in the D2D communication between the user equipment 1400 and the other user equipment.

According to the embodiments of the present disclosure, the user equipment 1400 may transmit resource request information to the network side equipment through the communication unit 1410. The user equipment 1400 may further receive resource scheduling information from the network side equipment through the communication unit 1410. The resource scheduling information includes COT sharing indication information of the user equipment 1400.

It can be seen that the user equipment 1400 according to the embodiments of the present disclosure may acquire, from the other user equipment or the network side equipment, the time frequency resources used when the user equipment 1400 shares COT with other user equipment to realize COT sharing between user equipments, so as to support COT sharing in D2D communication mode, thereby properly making use of a channel and simplifying a process of using an unauthorized frequency band in D2D communication.

The network side equipment 1100 according to the embodiments of the present disclosure may serve the user equipment 1400, and the user equipment 200 may perform D2D communication with the user equipment 1400, therefore, all embodiments of the user equipment 200 and all embodiments of the network side equipment 1100 that are described above are applicable to the user equipment 1400. In addition, the user equipment 1400 may have the same structure as the user equipment 200. That is, the user equipment 200 according to the embodiments of the present disclosure may include the determination unit 1420 and the generation unit 1430 that are shown in FIG. 14. The user equipment 1400 according to the embodiments of the present disclosure may further include the generation unit 210, the selection unit 230, the determination unit 240 and the detection unit 250 that are shown in FIG. 2. In other words, according to the embodiments of the present disclosure, in D2D communication, the user equipment may receive COT sharing indication information of the user equipment from other user equipment, and may also transmit COT sharing indication information of the other user equipment to the other user equipment.

5. Method Embodiment

A wireless communication method performed by the user equipment 200, a wireless communication method performed by the network side equipment 1100, and a wireless communication method performed by the user equipment 1400 according to the embodiments of the present disclosure are described in detail below.

Figure 15:
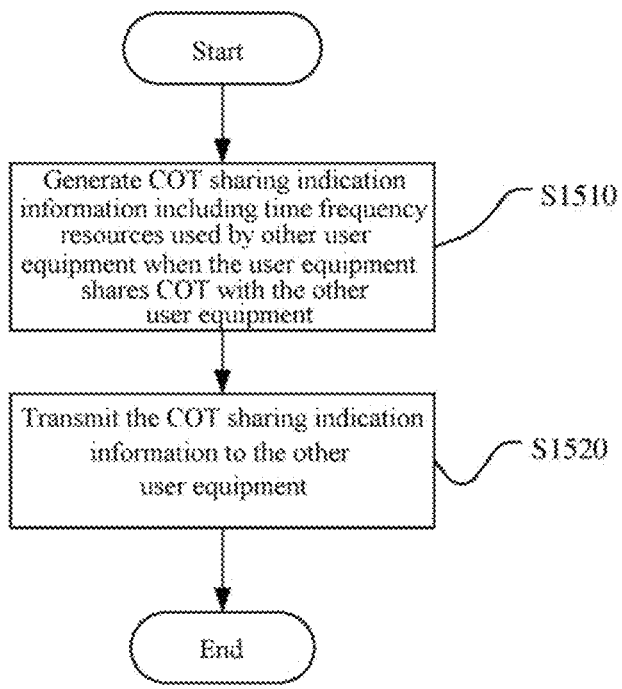
FIG. 15 is a flowchart of a wireless communication method performed by a user equipment according to an embodiment of the present disclosure.

FIG. 15 is a flowchart of the wireless communication method performed by the user equipment 200 in a wireless communication system according to an embodiment of the present disclosure.

As shown in FIG. 15, in step S1510, COT sharing indication information is generated. The COT sharing indication information includes time frequency resources used by other user equipment when the user equipment shares COT with the other user equipment.

Next, in step S1520, the COT sharing indication information is transmitted to the other user equipment.

Preferably, the wireless communication method further includes: carrying the COT sharing indication information through SCI.

Preferably, the COT sharing indication information includes a start time and an end time of the time resources used by the other user equipment when the user equipment shares COT with the other user equipment.

Preferably, the wireless communication method further includes: transmitting resource request information to a network side equipment serving the user equipment, and generating COT sharing indication information according to resource scheduling information received from the network side equipment.

Preferably, the wireless communication method further includes: autonomously selecting resources from a resource pool, and generating COT sharing indication information according to the autonomously selected resources.

Preferably, the COT sharing indication information includes time frequency resources used by each of multiple other user equipments when the user equipment shares COT with the other user equipment.

Preferably, the COT sharing indication information further includes time frequency resources used when two other user equipments share COT with each other.

Preferably, the wireless communication method further includes: receiving, from the other user equipment, COT use indication information about a use condition by the other user equipment with respect to time frequency resources.

Preferably, the wireless communication method further includes: determining, according to the COT use indication information, whether the other user equipment uses time frequency resources.

Preferably, the wireless communication method further includes: determining time frequency resources remaining within the COT according to the COT use indication information.

Preferably, the wireless communication method further includes: performing, after the user equipment performs transmission between the user equipment and the other user equipment, channel detection to use the time frequency resources remaining within the COT.

According to the embodiments of the present disclosure, the above method may be performed by the user equipment 200 according to the embodiments of the present disclosure. Therefore, all embodiments of the user equipment 200 described above are applicable herein.

The wireless communication method performed by the network side equipment 1100 in a wireless communication system according to an embodiment of the present disclosure is described in detail below.

Figure 16:
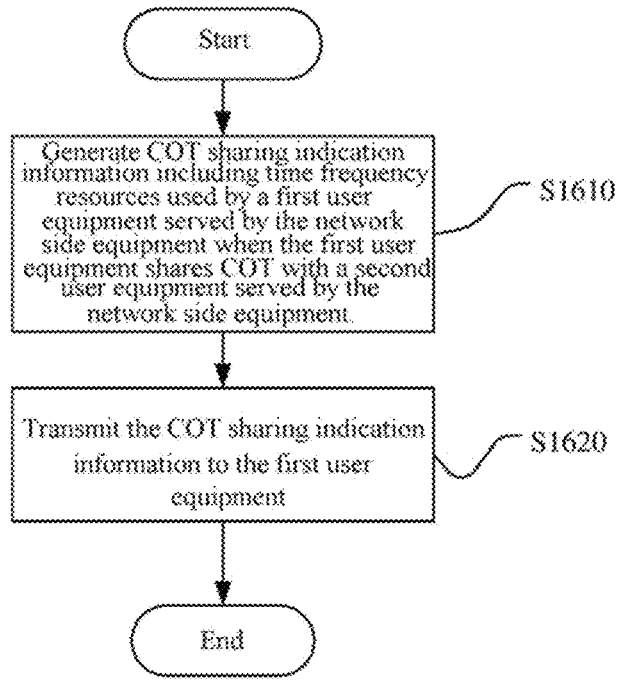
FIG. 16 is a flowchart of a wireless communication method performed by a network side equipment according to an embodiment of the present disclosure.

FIG. 16 is a flowchart of the wireless communication method performed by the network side equipment 1100 in a wireless communication system according to an embodiment of the present disclosure.

As shown in FIG. 16, in step S1610, COT sharing indication information is generated. The COT sharing indication information includes time frequency resources used by a first user equipment served by the network side equipment when the first user equipment shares COT with a second user equipment served by the network side equipment.

Next, in step S1620, the COT sharing indication information is transmitted to the first user equipment.

Preferably, the wireless communication method further includes: carrying COT sharing indication information transmitted to the first user equipment through DCI.

Preferably, the COT sharing indication information includes a start time and an end time of time resources used by the first user equipment when the first user equipment shares COT with the second user equipment.

Preferably, the wireless communication method further includes: receiving resource request information from the first user equipment, and generating resource scheduling information of the first user equipment according to the resource request information from the first user equipment. The resource scheduling information includes COT sharing indication information.

Preferably, the wireless communication method further includes: receiving resource request information from the second user equipment and generating resource scheduling information of the second user equipment according to the resource request information from the second user equipment. The resource scheduling information includes COT sharing indication information of the second user equipment. The COT sharing indication information of the second user equipment includes the time frequency resources used by the second user equipment when the first user equipment shares COT with the second user equipment.

Preferably, the wireless communication method further includes: transmitting the COT sharing indication information of the second user equipment to the second user equipment.

Preferably, the wireless communication method further includes: carrying the COT sharing indication information transmitted to the second user equipment through downlink control information DCI.

Preferably, the wireless communication method further includes: transmitting the COT sharing indication information of the second user equipment to the first user equipment.

According to the embodiments of the present disclosure, the above method may be performed by the network side equipment 1100 according to the embodiments of the present disclosure. Therefore, all embodiments of the network side equipment 1100 described above are applicable herein.

The wireless communication method performed by the user equipment 1400 according to the embodiments of the present disclosure is described in detail below.

Figure 17:
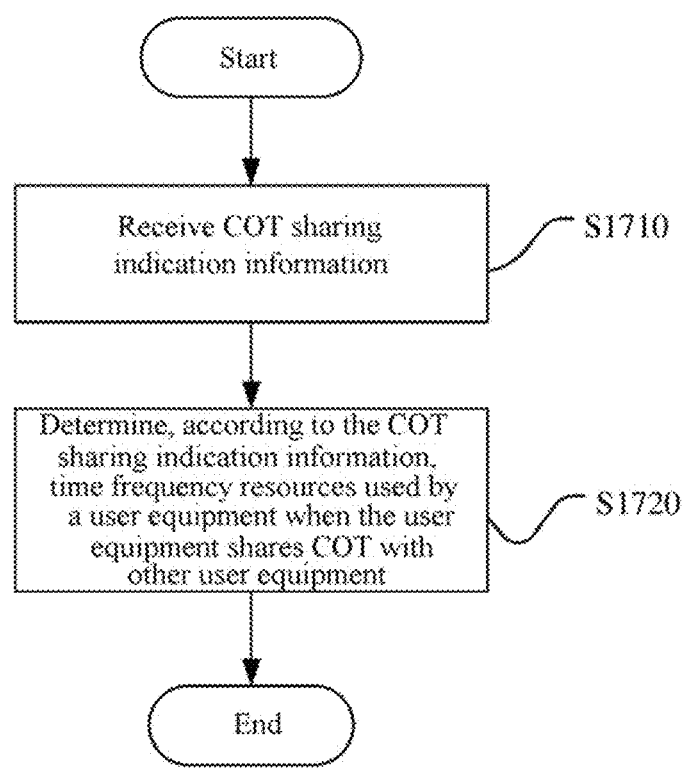
FIG. 17 is a flowchart of a wireless communication method performed by a user equipment according to another embodiment of the present disclosure.

FIG. 17 is a flowchart of the wireless communication method performed by the user equipment 1400 in a wireless communication system according to an embodiment of the present disclosure.

As shown in FIG. 17, in step S1710, COT sharing indication information is received.

Next, in step S1720, time frequency resources used by a user equipment when the user equipment shares COT with other user equipment are determined according to the COT sharing indication information.

Preferably, the wireless communication method further includes: determining, according to the COT sharing indication information, a start time and an end time of the time resources used by the user equipment when the user equipment shares the COT with the other user equipment.

Preferably, the wireless communication method further includes: receiving COT sharing indication information from the other user equipment.

Preferably, the wireless communication method further includes: receiving the COT sharing indication information through SCI.

Preferably, the wireless communication method further includes: receiving COT sharing indication information from a network side equipment serving the user equipment.

Preferably, the wireless communication method further includes: transmitting resource request information to the network side equipment, and receiving resource scheduling information including COT sharing indication information from the network side equipment.

Preferably, the wireless communication method further includes: transmitting COT use indication information about a use condition by the user equipment with respect to time frequency resources to the other user equipment.

Preferably, the COT use indication information indicates whether the user equipment uses the time frequency resources.

Preferably, the COT use indication information indicates time frequency resources remaining within the COT.

According to the embodiments of the present disclosure, the above method may be performed by the user equipment 1100 according to the embodiments of the present disclosure. Therefore, all embodiments of the user equipment 1100 described above are applicable herein.

6. Application Example

The technology according to the present disclosure may be applicable to various productions.

The network side equipment may be implemented as any types of TRP. The TRP may have a function of transmitting and receiving. For example, the TRP may receive information from a user equipment and a base station device and may further transmit information to a user equipment and a base station device. In an example, the TRP may serve a user equipment and may be controlled by a base station device. Further, the TRP may have a structure similar to that of a base station device described below or only have a structure related to information transmitting and receiving in the base station device.

The network side equipment may be implemented as any types of base station device, such as a macro eNB and a small eNB. The network side equipment may further be implemented as any types of gNB. The small eNB may be an eNB of a cell having a smaller coverage than a macro cell, such as a pico eNB, a micro eNB and a home (femto) eNB. Alternatively, the base station may be implemented as any other types of base stations, such as a NodeB and a base transceiver station (BTS). The base station may include: a main body (also referred to as a base station device) configured to control the wireless communication; and one or more remote radio heads (RRH) arranged at a different location from the main body.

The user equipment may be implemented as a mobile terminal (such as a smartphone, a tablet personal computer (PC), a notebook PC, a portable game terminal, a portable/dongle mobile router and a digital camera) or a vehicle terminal (such as a vehicle navigation device). The user equipment may further be implemented as a terminal performing machine to machine (M2M) communications (which is also referred to as a machine type communication (MTC) terminal). In addition, the user equipment may further be a wireless communication module (such as an integrated circuitry module including one wafer) mounted on each of the above terminals.

Application Example of a Base Station

First Application Example

Figure 18:
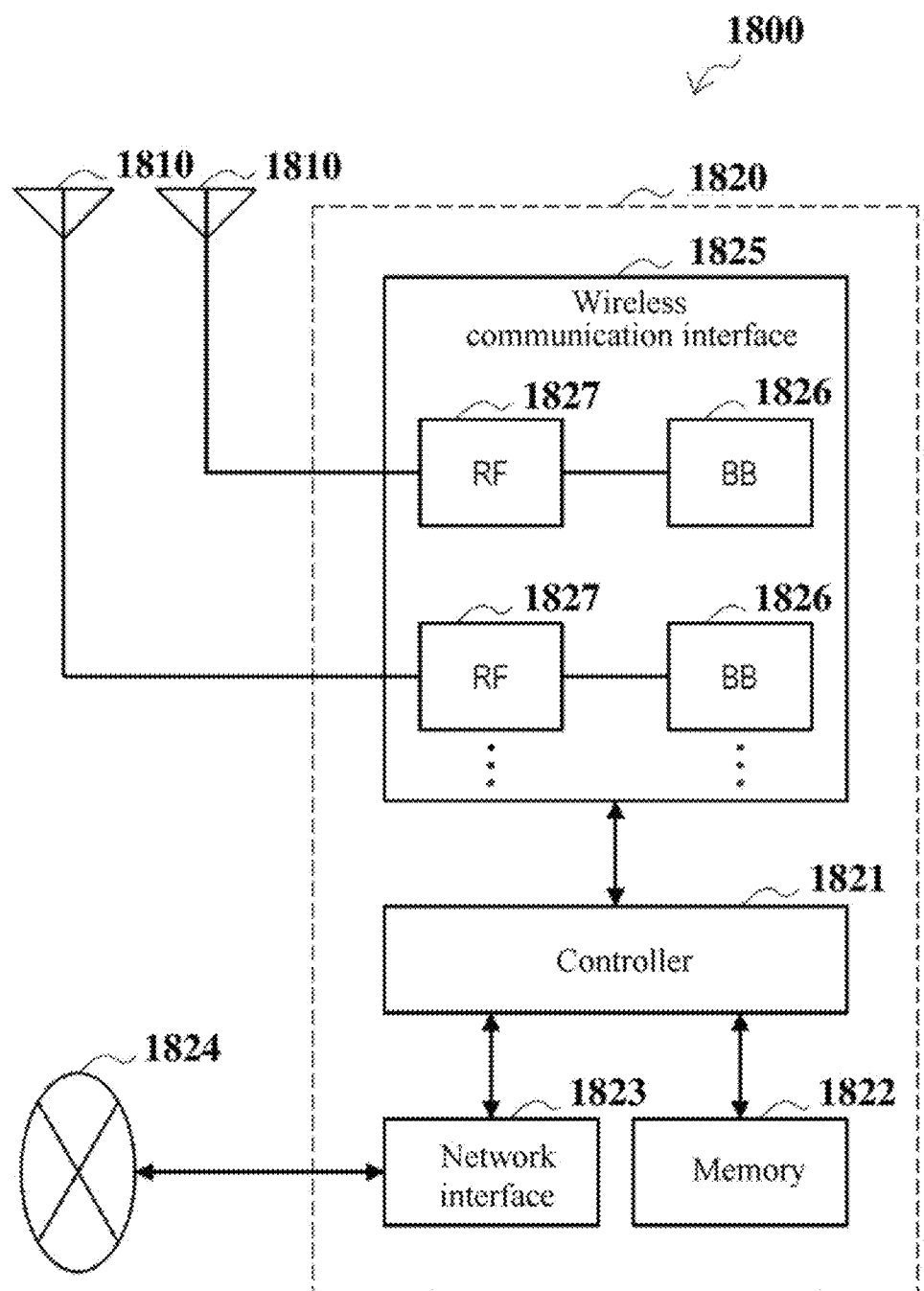
FIG. 18 is a block diagram showing a first example of exemplary configuration of an Evolved Node B (eNB)

FIG. 18 is a block diagram showing a first example of exemplary configuration of an eNB to which technology according to the present disclosure may be applied. An eNB 1800 includes one or more antennas 1810 and a base station device 1820. Each of the antennas 1810 is connected to the base station device 1820 via a RF cable.

Each of the antennas 1810 includes a single antenna element or multiple antenna elements (such as multiple antenna elements included in a multiple-input multiple-output (MIMO) antenna), and is used for the base station device 1820 to transmit and receive a wireless signal. The eNB 1800 may include multiple antennas 1810, as shown in FIG. 18. For example, the multiple antennas 1810 may be compatible with multiple frequency bands used by the eNB 1800. Although FIG. 18 shows an example in which the eNB 1800 includes the multiple antennas 1810, the eNB 1800 may also include a single antenna 1810.

The base station device 1820 includes a controller 1821, a memory 1822, a network interface 1823 and a wireless communication interface 1825.

The controller 1821 may be, for example, a CPU or a DSP, and operate various functions of a high layer of the base station device 1820. For example, the controller 1821 generates a data packet according to data in a signal processed by the wireless communication interface 1825 and transmits the generated packet via the network interface 1823. The controller 1821 may bundle data from multiple baseband processors to generate a bundled packet and transmit the generated bundled packet. The controller 1821 may have a logic function that performs control such as wireless resource control, wireless bearer control, mobility management, admission control, and scheduling. The control may be performed in combination with a nearby eNB or core network node. The memory 1822 includes an RAM and an ROM, and stores a program executed by the controller 1821 and various types of control data (such as a terminal list, transmission power data and scheduling data).

The network interface 1823 is a communication interface via which the base station device 1820 is connected to a core network 1824. The controller 1821 may communicate with a core network node or another eNB via the network interface 1823. In this case, the eNB 1800 may be connected to the core network node or another eNB via a logical interface (such as an interface S1 and an interface X2). The network interface 1823 may also be a wired communication interface or a wireless communication interface for wireless backhaul line. If the network interface 1823 is the wireless communication interface, the network interface 1823 may use a frequency band for wireless communication higher than a frequency band used by the wireless communication interface 1825.

The wireless communication interface 1825 supports any cellular communication scheme (such as long term evolution (LTE) and LTE-Advanced), and provides wireless connection to a terminal located in a cell of the eNB 1800 via an antenna 1810. The wireless communication interface 1825 may include, for example, a (base band) BB processor 1826 and RF circuitry 1827. The BB processor 1826 may perform, for example, encoding/decoding, modulating/demodulating, and multiplexing/de-multiplexing, and various types of signal processing of layers (such as L1, medium access control (MAC), radio link control (RLC) and packet data convergence protocol (PDCP)). Instead of the controller 1821, the BB processor 1826 may have a part or all of the above logic functions. The BB processor 1826 may be implemented as a memory storing a communication control program, or a module including a processor configured to execute a program and related circuitry. The function of the BB processor 1826 may be changed by updating the program. The module may be a card or blade inserted into a slot of the base station device 1820. Alternatively, the module may be a chip mounted on the card or the blade. Further, the RF circuitry 1827 may include, for example, a mixer, a filter or an amplifier, and transmits and receives a wireless signal via the antenna 1810.

As shown in FIG. 18, the wireless communication interface 1825 may include multiple BB processors 1826. For example, the multiple BB processors 1826 may be compatible with multiple frequency bands used by the eNB 1800. As shown in FIG. 18, the wireless communication interface 1825 may include multiple RF circuitry 1827. For example, the multiple RF circuitry 1827 may be compatible with multiple antenna elements. Although FIG. 18 shows an example in which the wireless communication interface 1825 includes multiple BB processors 1826 and multiple RF circuitry 1827, the wireless communication interface 1825 may include a single BB processor 1826 or single RF circuitry 1827.

Second Application Example

Figure 19:
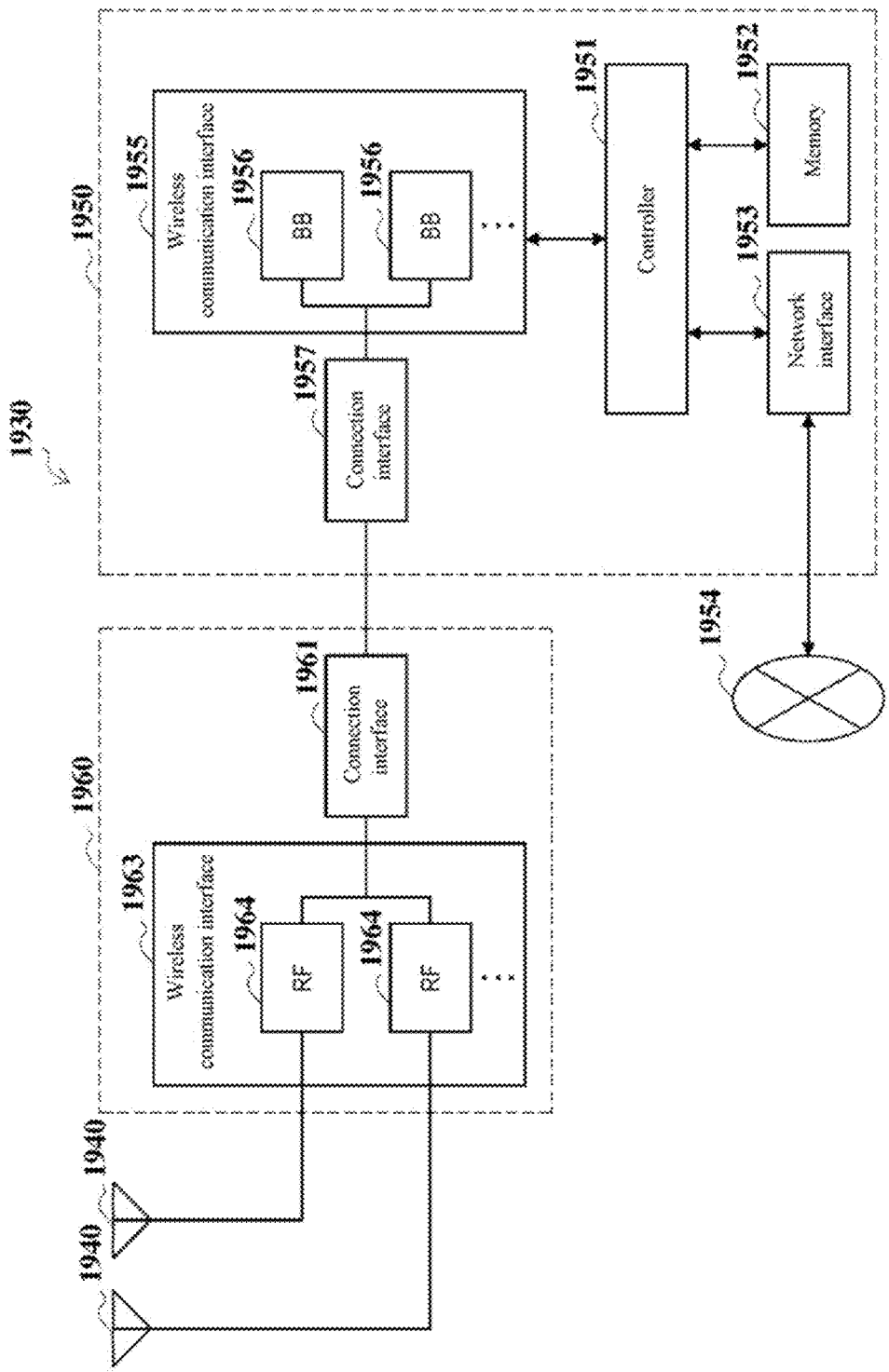
FIG. 19 is a block diagram showing a second example of the exemplary configuration of the eNB.

FIG. 19 is a block diagram showing a second example of the exemplary configuration of an eNB to which the technology of the present disclosure may be applied. An eNB 1930 includes one or more antennas 1940, a base station device 1950 and an RRH 1960. The RRH 1960 may be connected to each of the antennas 1940 via an RF cable. The base station device 1950 may be connected to the RRH 1960 via a high speed line such as an optical fiber cable.

Each of the antennas 1940 includes a single or multiple antenna elements (such as multiple antenna elements included in a MIMO antenna), and is used for the RRH 1960 to transmit and receive a wireless signal. As shown in FIG. 19, the eNB 1930 may include multiple antennas 1940. For example, the multiple antennas 1940 may be compatible with multiple frequency bands used by the eNB 1930. Although FIG. 19 shows an example in which the eNB 1930 includes the multiple antennas 1940, the eNB 1930 may also include a single antenna 1940.

The base station device 1950 includes a controller 1951, a memory 1952, a network interface 1953, a wireless communication interface 1955, and a connection interface 1957. The controller 1951, the memory 1952, and the network interface 1953 are respectively the same as the controller 1821, the memory 1822, and the network interface 1823 described with reference to FIG. 18.

The wireless communication interface 1955 supports any cellular communication schemes (such as LTE and LTE-advanced), and provides wireless communication with a terminal located in a sector corresponding to the RRH 1960 via the RRH 1960 and the antenna 1940. The wireless communication interface 1955 may generally include, for example, a BB processor 1956. Except for the BB processor 1956 being connected to RF circuitry 1964 of the RRH 1960 via the connection interface 1957, the BB processor 1956 is the same as the BB processor 1826 described with reference to FIG. 18. The wireless communication interface 1955 may include multiple BB processors 1956, as shown in FIG. 19. For example, the multiple BB processors 1956 may be compatible with multiple frequency bands used by the eNB 1930. Although FIG. 19 shows an example in which the wireless communication interface 1955 includes multiple BB processors 1956, the wireless communication interface 1955 may also include a single BB processor 1956.

The connection interface 1957 is an interface for connecting the base station device 1950 (the wireless communication interface 1955) to the RRH 1360. The connection interface 1957 may also be a communication module for communication in the above high speed line that connects the base station device 1950 (the wireless communication interface 1955) to the RRH 1960.

The RRH 1960 includes a connection interface 1961 and a wireless communication interface 1963.

The connection interface 1961 is an interface for connecting the RRH 1960 (the wireless communication interface 1963) to the base station device 1950. The connection interface 1961 may also be a communication module for communication in the above-described high speed line.

The wireless communication interface 1963 transmits and receives a wireless signal via the antenna 1940. The wireless communication interface 1963 may generally include, for example, the RF circuitry 1964. The RF circuitry 1964 may include, for example, a mixer, a filter, and an amplifier, and transmits and receives a wireless signal via the antenna 1940. The wireless communication interface 1963 may include multiple RF circuitry 1964, as shown in FIG. 19. For example, the multiple RF circuitry 1964 may support multiple antenna elements. Although FIG. 19 shows an example in which the wireless communication interface 1963 includes the multiple RF circuitry 1964, the wireless communication interface 1963 may also include single RF circuitry 1964.

In the eNB 1800 and the eNB 1930 respectively shown in FIG. 18 and FIG. 19, the generation unit 110 shown in FIG. 11 may be implemented by the controller 1821 and/or the controller 1951. At least a part of functions may also be implemented by the controller 1821 and the controller 1951. For example, the controller 1821 and/or the controller 1951 may generate the COT sharing indication information by executing instructions stored in a corresponding memory.

Application Example of a Terminal Device

First Application Example

Figure 20:
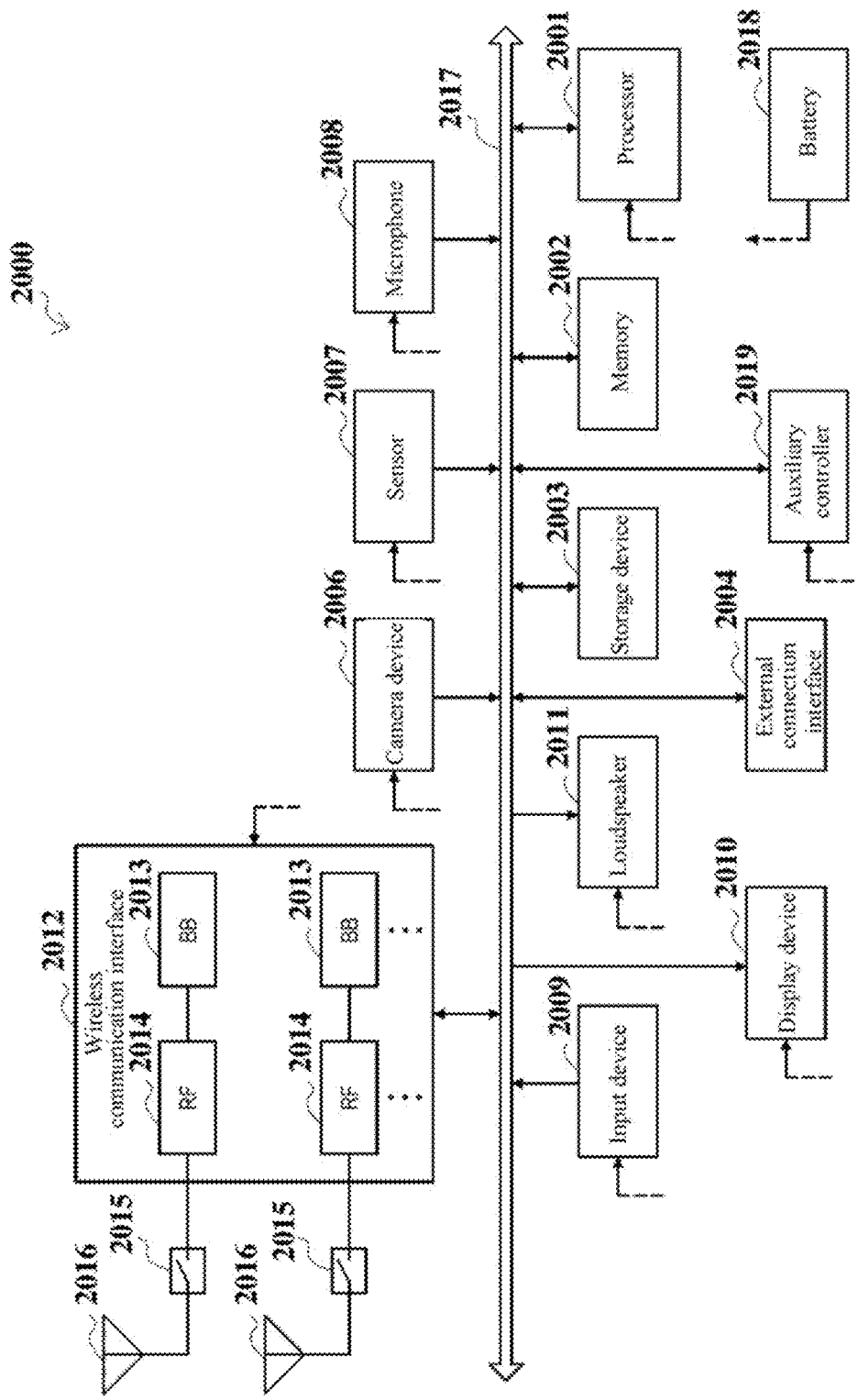
FIG. 20 is a block diagram showing an example of exemplary configuration of a smartphone.

FIG. 20 is a block diagram showing an exemplary configuration of a smartphone 2000 to which technology according to the present disclosure may be applied. The smartphone 2000 includes a processor 2001, a memory 2002, a storage device 2003, an external connection interface 2004, a camera device 2006, a sensor 2007, a microphone 2008, an input device 2009, a display device 2010, a loudspeaker 2011, a wireless communication interface 2012, one or more antenna switches 2015, one or more antennas 2016, a bus 2017, a battery 2018 and an auxiliary controller 2019.

The processor 2001 may be, for example, a CPU or a system on chip (SoC), and controls functions of an application layer and another layer of the smartphone 2000. The memory 2002 includes an RAM and an ROM, and stores a program executed by the processor 2001 and data. The storage device 2003 may include a storage medium such as a semiconductor memory and a hard disk. The external connection interface 2004 is an interface for connecting an external device (such as a memory card and a universal serial bus (USB) device) to the smartphone 2000.

The camera device 2006 includes an image sensor (such as a charge coupled device (CCD) and a complementary metal oxide semiconductor (CMOS)), and generates a captured image. The sensor 2007 may include a group of sensors such as a measurement sensor, a gyro sensor, a geomagnetic sensor, and an acceleration sensor. The microphone 2008 converts sound that is inputted to the smartphone 2000 into an audio signal. The input device 2009 includes, for example, a touch sensor configured to detect a touch on a screen of the display device 2010, a keypad, a keyboard, a button, or a switch, and receives an operation or information inputted from a user. The display device 2010 includes a screen (such as a liquid crystal display (LCD) and an organic light-emitting diode (OLED) display), and displays an output image of the smartphone 2000. The loudspeaker 2011 is configured to convert an audio signal outputted from the smartphone 2000 into sound.

The wireless communication interface 2012 supports any cellular communication scheme (such as LTE and LTE-Advanced), and performs wireless communications. The wireless communication interface 2012 may include, for example, a BB processor 2013 and RF circuitry 2014. The BB processor 2013 may perform, for example, coding/decoding, modulating/demodulating and multiplexing/demultiplexing, and perform various types of signal processing for wireless communications. The RF circuitry 2014 may include, for example, a mixer, a filter and an amplifier, and transmits and receives a wireless signal via an antenna 2016. The wireless communication interface 2012 may be a chip module having the BB processor 2013 and the RF circuitry 2014 integrated thereon. As shown in FIG. 20, the wireless communication interface 2012 may include multiple BB processors 2013 and multiple RF circuitry 2014. Although FIG. 20 shows an example in which the wireless communication interface 2012 includes the multiple BB processors 2013 and the multiple RF circuitry 2014, the wireless communication interface 2012 may include a single BB processor 2013 or single RF circuitry 2014.

Besides the cellular communication scheme, the wireless communication interface 2012 may support an additional type of wireless communication scheme, such as a short-distance wireless communication scheme, a near field communication scheme and a wireless local area network (LAN) scheme. In this case, the wireless communication interface 2012 may include the BB processor 2013 and the RF circuitry 2014 for each wireless communication scheme.

Each of the antenna switches 2015 switches a connection destination of the antenna 2016 among multiple circuitry (such as circuitry for different wireless communication schemes) included in the wireless communication interface 2012.

Each of the antennas 2016 includes a single antenna element or multiple antenna elements (such as multiple antenna elements included in an MIMO antenna), and is used for the wireless communication interface 2012 to transmit and receive a wireless signal. The smartphone 2000 may include multiple antennas 2016, as shown in FIG. 20. Although FIG. 20 shows an example in which the smartphone 2000 includes the multiple antennas 2016, the smartphone 2000 may also include a single antenna 2016.

In addition, the smartphone 2000 may include an antenna 2016 for each type of wireless communication scheme. In this case, the antenna switches 2015 may be omitted from the configuration of the smartphone 2000.

The processor 2001, the memory 2002, the storage device 2003, the external connection interface 2004, the camera device 2006, the sensor 2007, the microphone 2008, the input device 2009, the display device 2010, the loudspeaker 2011, the wireless communication interface 2012, and the auxiliary controller 2019 are connected to each other via the bus 2017. The battery 2018 supplies power to blocks of the smartphone 2000 shown in FIG. 20 via feeders that are partially shown with dashed lines in the drawings. The auxiliary controller 2019, for example, operates a minimum necessary function of the smartphone 2000 in a sleep mode.

In the smartphone 2000 shown in FIG. 20, the generation unit 210, the selection unit 230, the determination unit 240 and the detection unit 250 that are shown in FIG. 2 and the determination unit 1420 and the generation unit 1430 that are shown in FIG. 14 may be implemented by the processor 2001 or the auxiliary controller 2019. At least a part of functions may also be implemented by the processor 2001 or the auxiliary controller 2019. For example, the processor 2001 or the auxiliary controller 2019 may generate COT sharing indication information, selecting resources and performing channel detection by executing instructions stored in the memory 2002 or the storage device 2003.

Second Application Example

Figure 21:
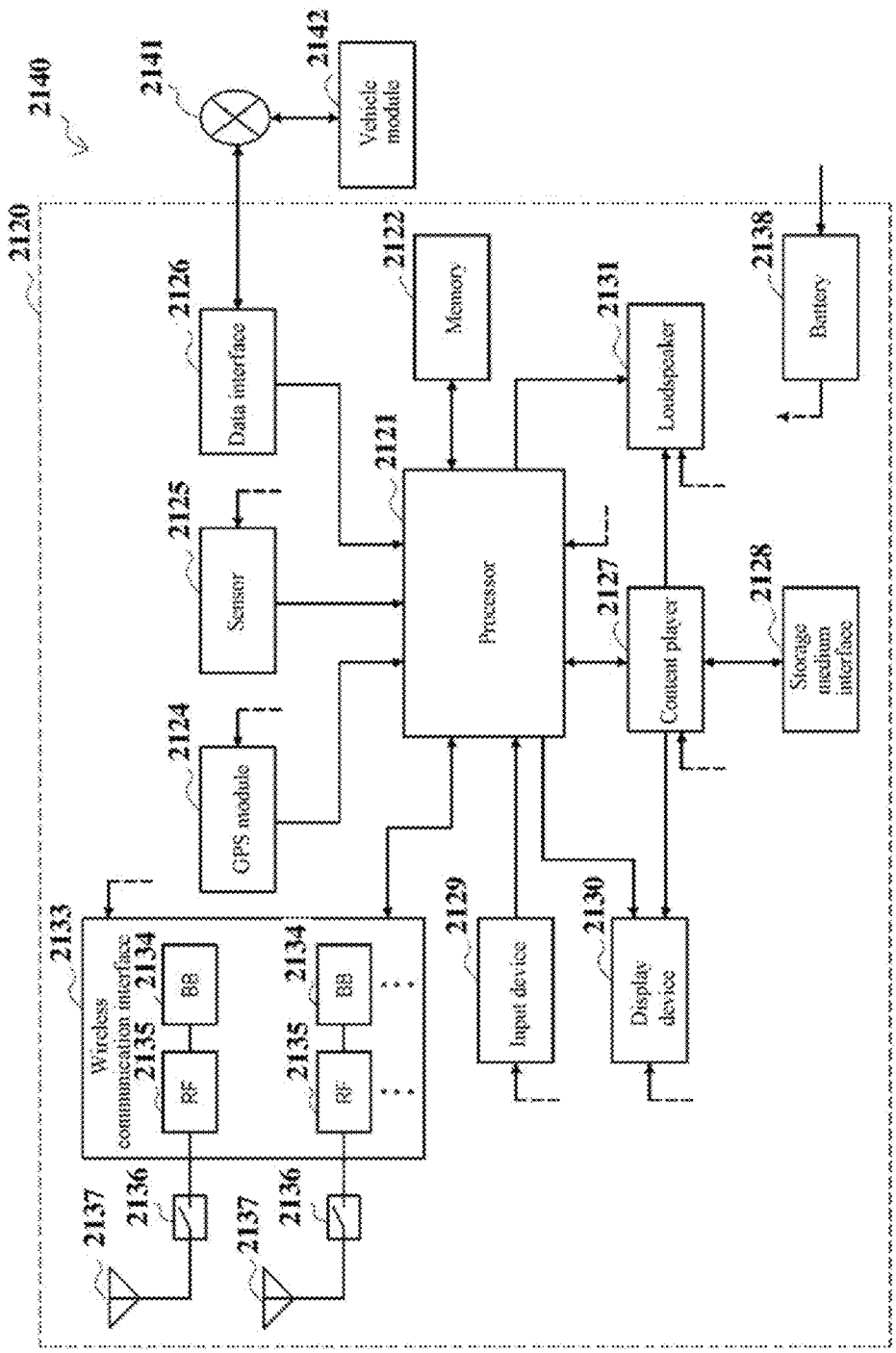
FIG. 21 is a block diagram showing an example of exemplary configuration of a vehicle navigation device.

FIG. 21 is a block diagram showing an example of schematic configuration of a vehicle navigation device 2120 to which the technology according to the present disclosure may be applied. The vehicle navigation device 2120 includes a processor 2121, a memory 2122, a global positioning system (GPS) module 2124, a sensor 2125, a data interface 2126, a content player 2127, a storage medium interface 2128, an input device 2129, a display device 2130, a loudspeaker 2131, a wireless communication interface 2133, one or more antenna switches 2136, one or more antennas 2137, and a battery 2138.

The processor 2121 may be, for example, a CPU or a SoC, and controls a navigation function and another function of the vehicle navigation device 2120. The memory 2122 includes an RAM and an ROM, and stores a program executed by the processor 2121, and data.

The GPS module 2124 uses a GPS signal received from a GPS satellite to calculate a location (such as a latitude, a longitude, and an altitude) of the vehicle navigation device 2120. The sensor 2125 may include a group of sensors such as a gyro sensor, a geomagnetic sensor, and an air pressure sensor. The data interface 2126 is connected to, for example, a vehicle network 2141 via a terminal that is not shown, and acquires data (such as vehicle speed data) generated by the vehicle.

The content player 2127 reproduces content stored in a storage medium (such as a CD and a DVD) that is inserted into the storage medium interface 2128. The input device 2129 includes, for example, a touch sensor configured to detect a touch on a screen of the display device 2130, a button, or a switch, and receives an operation or information inputted by a user. The display device 2130 includes a screen such as a LCD or an OLED display, and displays an image of the navigation function or reproduced content. The loudspeaker 2131 outputs sound of the navigation function or the reproduced content.

The wireless communication interface 2133 supports any cellular communication scheme (such as LTE and LTE-Advanced), and performs wireless communications. The wireless communication interface 2133 may generally include, for example, a BB processor 2134 and RF circuitry 2135. The BB processor 2134 may perform, for example, encoding/decoding, modulating/demodulating, and multiplexing/de-multiplexing, and performs various types of signal processing for wireless communications. In addition, the RF circuitry 2135 may include, for example, a mixer, a filter, and an amplifier, and transmits and receives a wireless signal via the antenna 2137. The wireless communication interface 2133 may also be a chip module having the BB processor 2134 and the RF circuitry 2135 integrated thereon. The wireless communication interface 2133 may include multiple BB processors 2134 and multiple RF circuitry 2135, as shown in FIG. 21. Although FIG. 21 shows an example in which the wireless communication interface 2133 includes the multiple BB processors 2134 and the multiple RF circuitry 2135, the wireless communication interface 2133 may include a single BB processor 2134 or single RF circuitry 2135.

In addition to a cellular communication scheme, the wireless communication interface 2133 may support another type of wireless communication scheme such as a short-distance wireless communication scheme, a near field communication scheme, and a wireless LAN scheme. In that case, the wireless communication interface 2133 may include a BB processor 2134 and RF circuitry 2135 for each wireless communication scheme.

Each of the antenna switches 2136 switches a connection destination of the antenna 2137 among multiple circuitry (such as circuitry for different wireless communication schemes) included in the wireless communication interface 2133.

Each of the antennas 2137 includes a single short-distance wireless or multiple antenna elements (such as multiple antenna elements included in an MIMO antenna), and is used for the wireless communication interface 2133 to transmit and receive a wireless signal. The vehicle navigation device 2120 may include multiple antennas 2137, as shown in FIG. 21. Although FIG. 21 shows an example in which the vehicle navigation device 2120 includes the multiple antennas 2137, the vehicle navigation device 2120 may include a single antenna 2137.

Furthermore, the vehicle navigation device 2120 may include an antenna 2137 for each wireless communication scheme. In that case, the antenna switches 2136 may be omitted from the configuration of the vehicle navigation device 2120.

The battery 2138 supplies power to blocks of the vehicle navigation device 2120 shown in FIG. 21 via feeders that are partially shown as dashed lines in FIG. 21. The battery 2138 accumulates power supplied from the vehicle.

In the vehicle navigation device 2120 shown in FIG. 21, the generation unit 210, the selection unit 230, the determination unit 240 and the detection unit 250 that are shown in FIG. 2 and the determination unit 1420 and the generation unit 1430 that are shown in FIG. 14 may be implemented by the processor 2121. At least a part of functions may also be implemented by the processor 2121. For example, the processor 2121 may generate COT sharing indication information, selecting resources and performing channel detection by executing instructions stored in the memory 2122.

The technology of the present disclosure may also be implemented as a vehicle system (or a vehicle) 2140 including one or more blocks in the vehicle navigation device 2120, the vehicle network 2141, and a vehicle module 2142. The vehicle module 2142 generates vehicle data (such as a vehicle speed, an engine speed, and fault information), and outputs the generated data to the vehicle network 2141.

Preferred embodiments of the present disclosure are described above with reference to the drawings. However, the present disclosure is not limited to the above examples. Those skilled in the art may obtain various modifications and changes within the scope of the appended claims. It should understand that these modifications and changes fall within the technical scope of the present disclosure.

For example, a unit shown with a dashed-line block in functional block diagrams shown in the drawings is optional in a corresponding device. Further, optional functional units may be combined in a suitable manner to achieve required functions.

For example, in the above embodiments, multiple functions included in one unit may be achieved by separate devices. Alternately, in the above embodiments, multiple functions achieved by multiple units may be achieved by separate devices. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in detail with reference to the drawings, it should be understood that the above-described embodiments are merely used for illustrating the present disclosure rather than intended to limit the present disclosure. Those skilled in the art can make various modifications and variations to the above-described embodiments without departing from the substance and scope of the present disclosure. Therefore, the scope of the present disclosure is defined only by the appended claims and their equivalents.

The invention claimed is:

1. A user equipment, comprising processing circuitry configured to:
generate Channel Occupy Time (COT) sharing indication information comprising time frequency resources used by other user equipment when the user equipment shares COT with the other user equipment; and
transmit the COT sharing indication information to the other user equipment.

2. The user equipment according to claim 1, wherein the COT sharing indication information comprises a start time and an end time of time resources used by the other user equipment when the user equipment shares COT with the other user equipment.

3. The user equipment according to claim 1, wherein the COT sharing indication information comprises time frequency resources used by each other user equipment of a plurality of other user equipments when the user equipment shares COT with the other user equipment.

4. The user equipment according to claim 3, wherein the COT sharing indication information further comprises time frequency resources used when two other user equipments share COT with each other.

5. The user equipment according to claim 1, wherein the processing circuitry is further configured to:
receive, from the other user equipment, COT use indication information about a use condition by the other user equipment with respect to the time frequency resources.

6. The user equipment according to claim 5, wherein the processing circuitry is further configured to:
determine, according to the COT use indication information, whether the other user equipment uses the time frequency resources.

7. The user equipment according to claim 5, wherein the processing circuitry is further configured to:
determine, according to the COT use indication information, time frequency resources remaining within the COT.

8. The user equipment according to claim 1, wherein the processing circuitry is further configured to:
perform, after the user equipment performs transmission between the user equipment and the other user equipment, channel detection to use the time frequency resources remaining within the COT.

9. A network side equipment, comprising processing circuitry configured to:
generate Channel Occupy Time (COT) sharing indication information comprising time frequency resources used by a first user equipment served by the network side equipment when the first user equipment shares COT with a second user equipment served by the network side equipment; and
transmit the COT sharing indication information to the first user equipment,
wherein the processing circuitry is further configured to:
receive resource request information from the first user equipment; and
generate resource scheduling information of the first user equipment according to the resource request information from the first user equipment wherein the resource scheduling information from the first user equipment comprises the COT sharing indication information of the first user equipment, and
wherein the processing circuitry is further configured to:
receive resource request information from the second user equipment;
generate resource scheduling information of the second user equipment according to the resource request information from the second user equipment, wherein the resource scheduling information from the second user equipment comprises COT sharing indication information of the second user equipment, and the COT sharing indication information of the second user equipment comprises time frequency resources used by, the second user equipment when the first user equipment shares COT with the second user equipment; and
transmit the COT sharing indication information of the second user equipment to the second user equipment.

10. The network side equipment according to claim 9, wherein the COT sharing indication information comprises a start time and an end time of the time resources used by the first user equipment when the first user equipment shares COT with the second user equipment.

11. A user equipment, comprising processing circuitry configured to:
   receive Channel Occupy Time (COT) sharing indication information from an other user equipment; and
   determine, according to the COT sharing indication information, time frequency resources used by the user equipment when the user equipment shares COT with other user equipment.

12. The user equipment according to claim 11, wherein the processing circuitry is further configured to:
   determine, according to the COT sharing indication information, a start time and an end time of time resources used by the user equipment when the user equipment shares COT with the other user equipment.

13. The user equipment according to claim 11, wherein the processing circuitry is further configured to:
   receive the COT sharing indication information from a network side equipment serving the user equipment.

14. The user equipment according to claim 11, wherein the processing circuitry is further configured to:
   transmit, to the other user equipment, COT use indication information about a use condition by the user equipment with respect to the time frequency resources.

15. The user equipment according to claim 14, wherein the COT use indication information indicates whether the user equipment uses the time frequency resources.

16. The user equipment according to claim 14, wherein the COT use indication information indicates time frequency resources remaining within the COT.

\* \* \* \* \*